US012416886B2

(12) United States Patent
Doda et al.

(10) Patent No.: US 12,416,886 B2
(45) Date of Patent: Sep. 16, 2025

(54) HEATER INCLUDING A PLURALITY OF HEAT GENERATION MEMBERS, FIXING APPARATUS, AND IMAGE FORMING APPARATUS

(71) Applicant: Canon Kabushiki Kaisha, Tokyo (JP)

(72) Inventors: Kazuhiro Doda, Yokohama (JP); Ken Nakagawa, Yokohama (JP); Tsuguhiro Yoshida, Yokohama (JP); Yutaka Sato, Komae (JP); Kohei Wakatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/456,569

(22) Filed: Aug. 28, 2023

(65) Prior Publication Data

US 2023/0400803 A1 Dec. 14, 2023

Related U.S. Application Data

(63) Continuation of application No. 17/883,799, filed on Aug. 9, 2022, now Pat. No. 11,774,891, which is a (Continued)

(30) Foreign Application Priority Data

Jan. 18, 2019 (JP) ................................ 2019-006469

(51) Int. Cl.
*G03G 15/20* (2006.01)

(52) U.S. Cl.
CPC ..... *G03G 15/2053* (2013.01); *G03G 15/2042* (2013.01); *G03G 15/2064* (2013.01); *G03G 2215/2035* (2013.01)

(58) Field of Classification Search
CPC ................................................ G03G 15/2053
See application file for complete search history.

(56) References Cited

U.S. PATENT DOCUMENTS 6,336,009 B1 1/2002 Suzumi et al.
6,580,883 B2 6/2003 Suzumi
(Continued)

FOREIGN PATENT DOCUMENTS

CN 102749830 A 10/2012
CN 103676575 A 3/2014
(Continued)

OTHER PUBLICATIONS

Chinese Office Action issued on Oct. 28, 2022 in counterpart Chinese Patent Application No. 202010050010.1.
(Continued)

*Primary Examiner* — Carla J Therrien
(74) *Attorney, Agent, or Firm* — Venable LLP

(57) ABSTRACT

The heater including a substrate, a first heat generation member, a second heat generation member having a length substantially a same in a longitudinal direction as a length of the first heat generation member, a third heat generation member having a length shorter than lengths of the first heat generation member and the second heat generation member in the longitudinal direction, and a fourth heat generation member having a length shorter than length of the third heat generation member in the longitudinal direction, wherein the first heat generation member, the second heat generation member, the third heat generation member and the fourth heat generation member are arranged on the substrate.

18 Claims, 13 Drawing Sheets

Related U.S. Application Data continuation of application No. 17/352,770, filed on Jun. 21, 2021, now Pat. No. 11,442,385, which is a continuation of application No. 16/744,669, filed on Jan. 16, 2020, now Pat. No. 11,073,778.

(56) References Cited

U.S. PATENT DOCUMENTS

| | | | | |
|---|---|---|---|---|
| 7,283,145 | B2 | 10/2007 | Kato et al. | |
| 8,995,859 | B2 | 3/2015 | Ogura | |
| 9,639,043 | B1 | 5/2017 | Kimura et al. | |
| 10,152,007 | B2 | 12/2018 | Narahara et al. | |
| 11,073,778 | B2 | 7/2021 | Doda et al. | |
| 11,442,385 | B2 | 9/2022 | Doda et al. | |
| 11,774,891 | B2 * | 10/2023 | Doda | G03G 15/2042 399/122 |
| 2005/0036809 | A1 | 2/2005 | Fukita et al. | |
| 2005/0280682 | A1 | 12/2005 | Kato et al. | |
| 2009/0230114 | A1 | 9/2009 | Taniguchi et al. | |
| 2011/0058864 | A1 | 3/2011 | Fujimoto et al. | |
| 2012/0269535 | A1 | 10/2012 | Mine et al. | |
| 2014/0076878 | A1 | 3/2014 | Shimura | |
| 2014/0138372 | A1 | 5/2014 | Ogura | |
| 2015/0331376 | A1 | 11/2015 | Shimmura et al. | |
| 2016/0234882 | A1 | 8/2016 | Takagi | |
| 2017/0013676 | A1 | 1/2017 | Aritaki et al. | |
| 2017/0023894 | A1 * | 1/2017 | Cao | G03G 15/2053 |
| 2017/0075269 | A1 | 3/2017 | Iwasaki et al. | |
| 2018/0173140 | A1 | 6/2018 | Imaizumi et al. | |
| 2020/0233346 | A1 | 7/2020 | Sato et al. | |
| 2020/0233349 | A1 | 7/2020 | Takano | |
| 2020/0249600 | A1 | 8/2020 | Yoshida et al. | |
| 2020/0333736 | A1 | 10/2020 | Lee | |

FOREIGN PATENT DOCUMENTS

| | | | |
|---|---|---|---|
| CN | 106527084 | A | 3/2017 |
| CN | 107683437 | A | 2/2018 |
| JP | 2000-162909 | A | 6/2000 |
| JP | 2000-162919 | A | 6/2000 |
| JP | 2000-250337 | A | 9/2000 |
| JP | 2002-162847 | A | 6/2002 |
| JP | 2006-004860 | A | 1/2006 |
| JP | 2008-040082 | A | 2/2008 |
| JP | 2012-128170 | A | 7/2012 |
| JP | 2012-226079 | A | 11/2012 |
| JP | 2013-235181 | A | 11/2013 |
| WO | 2019/124664 | A1 | 6/2019 |

OTHER PUBLICATIONS

Japanese Office Action issued on Nov. 22, 2022 in counterpart Japanese Patent Application No. 2019-006469.

Chinese Office Action issued on Mar. 8, 2023 in counterpart Chinese Patent Application No. 202010050010.1.

Japanese Office Action issued Mar. 26, 2024 in counterpart Japanese Patent Appln. No. 2023-071327.

* cited by examiner

EMBODIMENT 1

COMPARISON 1

| | HEAT GENERATION MEMBER PATTERNS | TEMPERATURE DIFFERENCES | SUBSTRATE BACKSURFACE TEMPERATURE PROFILES (A-A') |
|---|---|---|---|
| EMBODIMENT 1 (1) |   | 81 |   |
| EMBODIMENT 1 (2) |   | 97 | |
| EMBODIMENT 1 (3) |   | 120 | |
| COMPARISON EXAMPLE 1 (1) |   | 465 |   |
| COMPARISON EXAMPLE 1 (2) |   | 205 | |

| | HEAT GENERATION MEMBER PATTERNS | B5 MAXIMUM PRODUCTIVITY | A5 MAXIMUM PRODUCTIVITY |
|---|---|---|---|
| EMBODIMENT 1 |   | 39 | 46 |
| COMPARISON EXAMPLE 1 |   | 39 | 16 |

HEATER INCLUDING A PLURALITY OF HEAT GENERATION MEMBERS, FIXING APPARATUS, AND IMAGE FORMING APPARATUS

CROSS-REFERENCE TO RELATED APPLICATIONS

This application is a Continuation of U.S. patent application Ser. No. 17/883,799, filed on Aug. 9, 2022, which is a Continuation of U.S. patent application Ser. No. 17/352,770, filed on Jun. 21, 2021, issued as U.S. Pat. No. 11,442,385 on Sep. 13, 2022, which is a Continuation of U.S. patent application Ser. No. 16/744,669, filed on Jan. 16, 2020, issued as U.S. Pat. No. 11,073,778 on Jul. 27, 2021, which claims priority to Japanese Patent Application No. 2019-006469, filed on Jan. 18, 2019, the entire disclosures of which are hereby incorporated by reference herein.

BACKGROUND OF THE INVENTION

Field of the Invention

The present invention relates to a heater, a fixing apparatus, and an image forming apparatus, and particularly relates to a fixing apparatus and a heater in an image forming apparatus utilizing an electrophotography recording system, such as a laser printer, a copying machine and a facsimile.

Description of the Related Art

A fixing apparatus heats and fixes, to a paper, an unfixed toner image on the paper by using a heating member that includes a heat generation member having the almost same width (hereinafter referred to as the maximum width) as the maximum paper width that is able to be conveyed (hereinafter referred to as sheet feeding) in a nip portion. On the other hand, the paper sizes used by a user are varied in size, such as A4, B5 and A5. In a case where an A4 size sheet having a wide width is used, since the paper passes through an entire area (hereinafter referred to as a heating area) heated by the heating member including the heat generation member with the maximum width, the heating member and the fixing apparatus maintain a uniform temperature in the entire area. On the other hand, in a case where an A5 paper with a narrow width is used, the paper does not necessarily pass through the entire heating area of the heating member including the heat generation member having the maximum width. That is, although the A5 paper passes through a part of the heating area, the A5 paper does not pass through a part of the heating area. In an area (hereinafter referred to as the sheet feeding area) through which a paper passed in the heating area, since heat is taken by the paper, the temperature is low. On the other hand, in an area (hereinafter referred to as a non-sheet feeding area) through which a paper did not pass in the heating area, since heat is not taken by the paper, the temperature becomes high (temperature rise). There is a possibility of generating adverse image effects due to the temperature rise in this non-sheet feeding area. Therefore, for a paper with a narrow width, the temperature rise in the non-sheet feeding area is suppressed in advance by control that reduces the productivity. In order to suppress this reduction of productivity, for example, in Japanese Patent Application Laid-Open No. 2000-162909, a heat generation member having a wide width and a heat generation member having a narrow width are provided in a heating member, and the heat generation member with the narrow width is used when feeding a paper with a narrow width. Accordingly, the temperature rise of the non-sheet feeding area can be reduced, and high productivity can be maintained.

However, in a case where an unexpected circumstance is assumed in which a part of an apparatus breaks down, and power is excessively supplied to one of the heat generation members, there is a possibility that a substrate of the heating member (hereinafter referred to as the heating member substrate) is greatly deformed due to a rapid temperature rise of the heating member. When the temperature of the heating member substrate is partially and greatly increased, a portion having a great temperature rise and a portion having a small temperature rise are generated. In the portion having the great temperature rise, the heating member substrate is greatly extended. On the other hand, in the portion having the small temperature rise, the heating member substrate is hardly extended. Depending on the difference in the extension that differs for each portion of the heating member substrate, a distortion (heat stress) will occur in the heating member substrate. The greater the temperature rise or the temperature gradient generated in the heating member substrate, the greater the distortion (heat stress) generated in the heating member substrate will become.

SUMMARY OF THE INVENTION

One aspect of the present invention is a heater including a substrate, a first heat generation member, a second heat generation member having a length substantially a same in a longitudinal direction as a length of the first heat generation member, a third heat generation member having a length shorter than lengths of the first heat generation member and the second heat generation member in the longitudinal direction, and a fourth heat generation member having a length shorter than length of the third heat generation member in the longitudinal direction, wherein the first heat generation member, the second heat generation member, the third heat generation member and the fourth heat generation member are arranged on the substrate, the first heat generation member is arranged at one end of the substrate in a width direction, the second heat generation member is arranged at another end of the substrate in the width direction, to be symmetrical with the first heat generation member, and the third heat generation member and the fourth heat generation member are arranged between the first heat generation member and the second heat generation member in the width direction of the substrate.

Another aspect of the present invention is a heater including a first heat generation member, a second heat generation member, a third heat generation member having a length shorter than the first heat generation member and the second heat generation member in a longitudinal direction, a fourth heat generation member having a length shorter than the third heat generation member in the longitudinal direction, a first contact to which one ends of the first heat generation member and the second heat generation member are electrically connected, a second contact to which another ends of the first heat generation member and the second heat generation member, and one end of the third heat generation member are electrically connected, a third contact to which another end of the third heat generation member and one end of the fourth heat generation member are electrically connected; and a fourth contact to which another end of the fourth heat generation member is electrically connected.

A further aspect of the present invention is a fixing apparatus for fixing an unfixed toner image carried by a recording material, the fixing apparatus including a heater including a substrate, a first heat generation member, a second heat generation member having a length substantially a same in a longitudinal direction as a length of the first heat generation member, a third heat generation member having a length shorter than lengths of the first heat generation member and the second heat generation member in the longitudinal direction, and a fourth heat generation member having a length shorter than length of the third heat generation member in the longitudinal direction, wherein the first heat generation member, the second heat generation member, the third heat generation member and the fourth heat generation member are arranged on the substrate, the first heat generation member is arranged at one end of the substrate in a width direction, the second heat generation member is arranged at another end of the substrate in the width direction, to be symmetrical with the first heat generation member, and the third heat generation member and the fourth heat generation member are arranged between the first heat generation member and the second heat generation member in the width direction of the substrate, a first rotary member heated by the heater, and a second rotary member forming a nip portion with the first rotary member.

A still further aspect of the present invention is a fixing apparatus for fixing an unfixed toner image carried by a recording material, the fixing apparatus including a heater having a first heat generation member, a second heat generation member, a third heat generation member having a length shorter than the first heat generation member and the second heat generation member in a longitudinal direction, a fourth heat generation member having a length shorter than the third heat generation member in the longitudinal direction, a first contact to which one ends of the first heat generation member and the second heat generation member are electrically connected, a second contact to which another ends of the first heat generation member and the second heat generation member, and one end of the third heat generation member are electrically connected, a third contact to which another end of the third heat generation member and one end of the fourth heat generation member are electrically connected, and a fourth contact to which another end of the fourth heat generation member is electrically connected.

A still further aspect of the present invention is an image forming apparatus including an image forming unit configured to form an unfixed toner image on a recording material, and a fixing apparatus for fixing an unfixed toner image carried by a recording material, the fixing apparatus including a heater including a substrate, a first heat generation member, a second heat generation member having a length substantially a same in a longitudinal direction as a length of the first heat generation member, a third heat generation member having a length shorter than lengths of the first heat generation member and the second heat generation member in the longitudinal direction, and a fourth heat generation member having a length shorter than length of the third heat generation member in the longitudinal direction, wherein the first heat generation member, the second heat generation member, the third heat generation member and the fourth heat generation member are arranged on the substrate, the first heat generation member is arranged at one end of the substrate in a width direction, the second heat generation member is arranged at another end of the substrate in the width direction, to be symmetrical with the first heat generation member, and the third heat generation member and the fourth heat generation member are arranged between the first heat generation member and the second heat generation member in the width direction of the substrate, a first rotary member heated by the heater, and a second rotary member forming a nip portion with the first rotary member, wherein the fixing apparatus fixes the unfixed toner image to the recording material.

A still further aspect of the present invention is an image forming apparatus including an image forming unit configured to form an unfixed toner image on a recording material, and a fixing apparatus for fixing an unfixed toner image carried by a recording material, the fixing apparatus including a heater having a first heat generation member, a second heat generation member, a third heat generation member having a length shorter than the first heat generation member and the second heat generation member in a longitudinal direction, a fourth heat generation member having a length shorter than the third heat generation member in the longitudinal direction, a first contact to which one ends of the first heat generation member and the second heat generation member are electrically connected, a second contact to which another ends of the first heat generation member and the second heat generation member, and one end of the third heat generation member are electrically connected, a third contact to which another end of the third heat generation member and one end of the fourth heat generation member are electrically connected, and a fourth contact to which another end of the fourth heat generation member is electrically connected, wherein the fixing apparatus fixes the unfixed toner image to the recording material.

Further features of the present invention will become apparent from the following description of exemplary embodiments with reference to the attached drawings.

DESCRIPTION OF THE EMBODIMENTS

Figure 1:
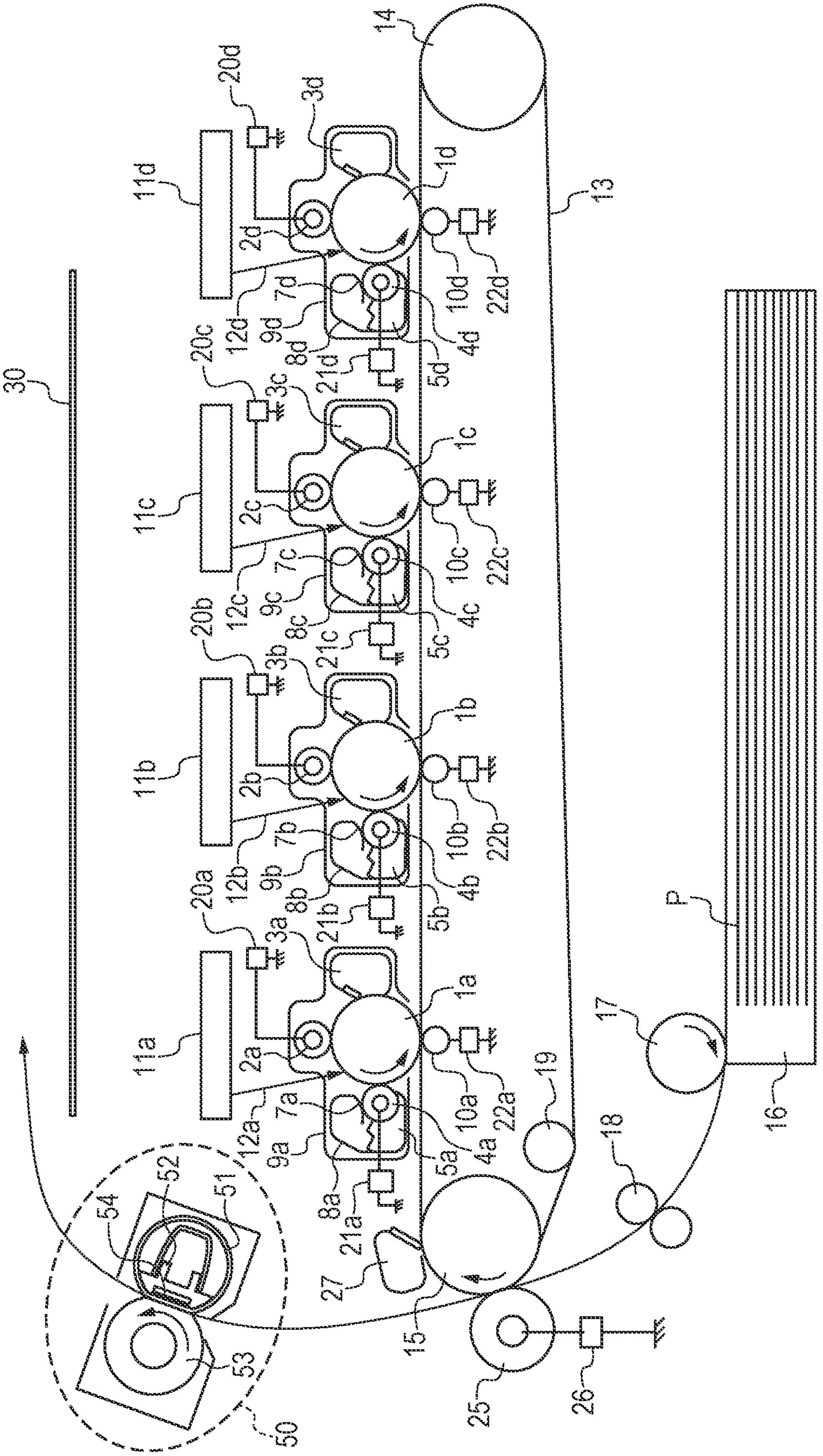
FIG. 1 is a general configuration diagram of an image forming apparatus of Embodiments 1 to 3.

Referring to the drawings, embodiments of the present invention will be described below. In the following embodiments, letting a paper pass through a fixation nip portion will be referred to as sheet feeding. Additionally, in the area in which the heat generation member is generating heat, the area through which a paper is not fed is referred to as the non-sheet feeding area (or the non-sheet feeding portion), and the area through which a paper is fed is referred to as the sheet feeding area (or the sheet feeding portion). Further, the phenomenon in which the temperature in the non-sheet feeding area becomes higher compared with that in the sheet feeding area is referred to as the non-sheet feeding portion temperature rise.

Embodiment 1

[Image Forming Apparatus]

FIG. 1 is a configuration diagram illustrating a color image forming apparatus of the in-line system, which is an example of an image forming apparatus carrying a fixing apparatus of Embodiment 1. The operation of the color image forming apparatus of the electrophotography system will be described by using FIG. 1. Note that it is assumed that a first station is a station for toner image formation of a yellow (Y) color, and a second station is a station for toner image formation of a magenta (M) color. Additionally, it is assumed that a third station is a station for toner image formation of a cyan (C) color, and a fourth station is a station for toner image formation of a black (K) color.

In the first station, a photosensitive drum 1*a*, which is an image carrier, is an OPC photosensitive drum. The photosensitive drum 1*a* is formed by stacking, on a metal cylinder, a plurality of layers of functional organic materials including a carrier generation layer exposed and generates an electric charge, a charge transport layer transporting the generated electric charge, etc., and the outermost layer has a low electric conductivity and is almost insulated. A charge roller 2*a*, which is a charging unit, abuts the photosensitive drum 1*a*, and uniformly charges a surface of the photosensitive drum 1*a* while performing following rotation with the rotation of the photosensitive drum 1*a*. The voltage superimposed with one of a DC voltage and an AC voltage is applied to the charge roller 2*a*, and when an electric discharge occurs in minute air gaps on the upstream side and the downstream side of a rotation direction from a nip portion between the charge roller 2*a* and the surface of the photosensitive drum 1*a*, the photosensitive drum 1*a* is charged. A cleaning unit 3*a* is a unit that cleans a toner remaining on the photosensitive drum 1*a* after the transfer, which will be described later. A development unit 8*a*, which is a developing unit, includes a developing roller 4*a*, a nonmagnetic monocomponent toner 5*a* and a developer application blade 7*a*. The photosensitive drum 1*a*, the charge roller 2*a*, the cleaning unit 3*a* and the development unit 8*a* form an integral-type process cartridge 9*a* that can be freely attached to and detached from the image forming apparatus.

An exposure device 11*a*, which is an exposing unit, includes one of a scanner unit scanning a laser beam with a polygon mirror, and an LED (light emitting diode) array, and irradiates a scanning beam 12*a* modulated based on an image signal on the photosensitive drum 1*a*. Additionally, the charge roller 2*a* is connected to a high voltage power supply for charge 20*a*, which is a voltage supplying unit to the charge roller 2*a*. The developing roller 4*a* is connected to a high voltage power supply for development 21*a*, which is a voltage supplying unit to the developing roller 4*a*. A primary transfer roller 10*a* is connected to a high voltage power supply for primary transfer 22*a*, which is a voltage supplying unit to the primary transfer roller 10*a*. The first station is configured as described above, and the second, third and fourth stations are also configured in the same manner. For the other stations, the identical numerals are assigned to the components having the identical functions as those of the first station, and b, c and d are assigned as the subscripts of the numerals for the respective stations. Note that, in the following description, the subscripts a, b, c and d are omitted, except for a case where a specific station is described.

An intermediate transfer belt 13 is supported by three rollers, i.e., a secondary transfer opposing roller 15, a tension roller 14, and an auxiliary roller 19, as its stretching members. The force in the direction of stretching the intermediate transfer belt 13 is applied only to the tension roller 14 by a spring, and a suitable tension force for the intermediate transfer belt 13 is maintained. The secondary transfer opposing roller 15 is rotated in response to the rotation drive from a main motor (not illustrated), and the intermediate transfer belt 13 wound around the outer circumference is rotated. The intermediate transfer belt 13 moves at substantially the same speed in a forward direction (for example, the clockwise direction in FIG. 1) with respect to the photosensitive drums 1*a* to 1*d* (for example, rotated in the counter clockwise direction in FIG. 1). Additionally, the intermediate transfer belt 13 is rotated in an arrow direction (the clockwise direction), and the primary transfer roller 10 is arranged on the opposite side of the photosensitive drum 1 across the intermediate transfer belt 13, and performs the following rotation with the movement of the intermediate transfer belt 13. The position at which the photosensitive drum 1 and the primary transfer roller 10 abut each other across the intermediate transfer belt 13 is called a primary transfer position. The auxiliary roller 19, the tension roller 14 and the secondary transfer opposing roller 15 are electrically grounded. Note that, also in the second to fourth stations, since primary transfer rollers to 10*d* are configured in the same manner as the primary transfer roller 10*a* of the first station, a description will be omitted.

Next, the image forming operation of the image forming apparatus of Embodiment 1 will be described. An image forming apparatus starts the image forming operation, when a print command is received in a standby state. The photosensitive drum 1, the intermediate transfer belt 13, etc. start rotation in the arrow direction at a predetermined process speed by the main motor (not illustrated). The photosensitive drum 1*a* is uniformly charged by the charge roller 2*a* to which the voltage is applied by the high voltage power supply for charge 20*a*, and subsequently, an electrostatic latent image according to image information is formed by the scanning beam 12*a* irradiated from the exposure device 11*a*. A toner 5*a* in the development unit 8*a* is charged in negative polarity by the developer application blade 7*a*, and is applied to the developing roller 4*a*. Then, a predetermined developing voltage is supplied to the developing roller 4*a* by the high voltage power supply for development 21*a*. When the photosensitive drum 1*a* is rotated, and the electrostatic latent image formed on the photosensitive drum 1*a* reaches the developing roller 4*a*, the electrostatic latent image is visualized when the toner of negative polarity adheres, and a toner image of the first color (for example, Y (yellow)) is formed on the photosensitive drum 1*a*. The respective stations (process cartridges 9*b* to 9*d*) of the other colors M (magenta), C (cyan) and K (black) are also similarly operated. An electrostatic latent image is formed on each of the photosensitive drums 1*a* to 1*d* by exposure, while delaying a writing signal from a controller (not illustrated) with a fixed timing, according to the distance between the primary transfer positions of the respective colors. A DC high voltage having the reverse polarity to that of the toner is applied to each of the primary transfer rollers 10*a* to 10*d*. With the above-described processes, toner images are sequentially transferred to the intermediate transfer belt 13 (hereinafter referred to as the primary transfer), and a multi toner image is formed on the intermediate transfer belt 13.

Thereafter, according to imaging of the toner image, a paper P that is a recording material loaded in a cassette 16 is fed (picked up) by a sheet feeding roller 17 rotated and driven by a sheet feeding solenoid (not illustrated). The fed paper P is conveyed to a registration roller (hereinafter referred to as the resist roller) 18 by a conveyance roller. The paper P is conveyed by the resist roller 18 to a transfer nip portion, which is an abutting portion between the intermediate transfer belt 13 and a secondary transfer roller 25, in synchronization with the toner image on the intermediate transfer belt 13. The voltage having the reverse polarity to that of the toner is applied to the secondary transfer roller 25 by a high voltage power supply for secondary transfer 26, and the four-color multi toner image carried on the intermediate transfer belt 13 is collectively transferred onto the paper P (onto the recording material) (hereinafter referred to as the secondary transfer). The members (for example, the photosensitive drum 1) that have contributed to the formation of the unfixed toner image on the paper P function as an image forming unit. On the other hand, after completing the secondary transfer, the toner remaining on the intermediate transfer belt 13 is cleaned by a cleaning unit 27. The paper P to which the secondary transfer is completed is conveyed to a fixing apparatus which is a fixing unit, and is discharged to a discharge tray 30 as an image formed matter (a print, a copy) in response to fixing of the toner image. A film 51 of the fixing apparatus 50, a nip forming member 52, a pressure roller 53 and a heater 54 will be described later.

[Block Diagram of Image Forming Apparatus]

Figure 2:
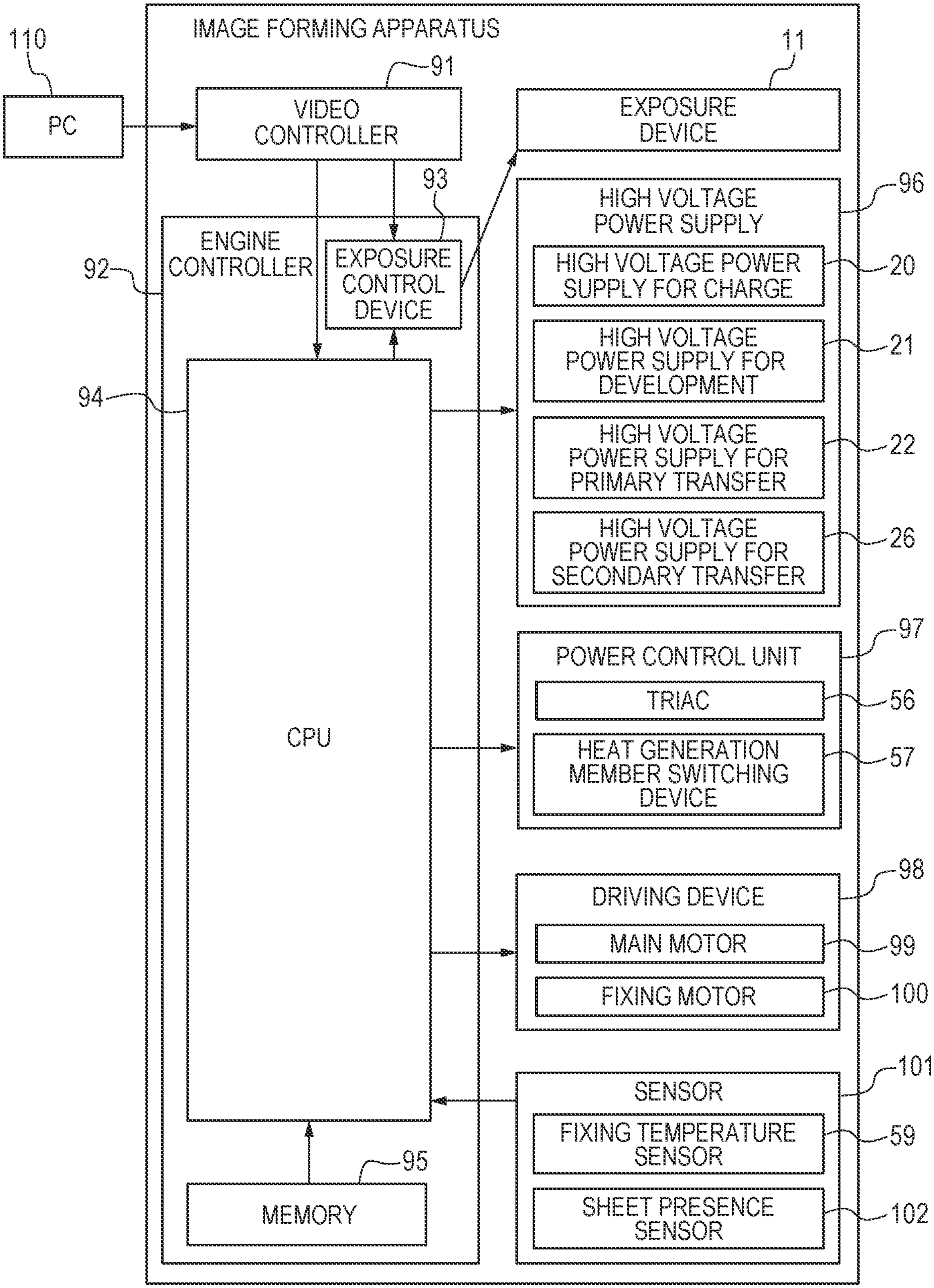
FIG. 2 is a control block diagram of the image forming apparatus of Embodiments 1 to 3.

FIG. 2 is a block diagram for describing the operation of the image forming apparatus, and referring to this drawing, the print operation of the image forming apparatus will be described. APC 110, which is a host computer, outputs a print command to a video controller 91 inside the image forming apparatus, and plays the role of transferring image data of a printing image to the video controller 91.

The video controller 91 converts the image data from the PC 110 into exposure data, and transfers it to an exposure control device 93 inside an engine controller 92. The exposure control device 93 is controlled from a CPU 94, and performs turning on and off of exposure data, and control of the exposure device 11. The CPU 94, which is a control unit, starts an image forming sequence, when a print command is received.

The CPU 94, a memory 95, etc. are mounted in the engine controller 92, and the operation programmed in advance is performed. The high voltage power supply 96 includes the above-described high voltage power supply for charge 20, high voltage power supply for development 21, high voltage power supply for primary transfer 22 and high voltage power supply for secondary transfer 26. Additionally, a power control unit 97 includes a bidirectional thyristor (hereinafter referred to as the triac) 56, a heat generation member switching device 57 as a switching unit that exclusively selects a heat generation member supplying power, etc. The power control unit 97 selects the heat generation member that generates heat in the fixing apparatus 50, and determines the electric energy to be supplied. Additionally, a driving device 98 includes a main motor 99, a fixing motor 100, etc. In addition, a sensor 101 includes a fixing temperature sensor 59 that detects the temperature of the fixing apparatus 50, a sheet presence sensor 102 that has a flag and detects the existence of the paper P, etc., and the detection result of the sensor 101 is transmitted to the CPU 94. The CPU 94 obtains the detection result of the sensor 101 in the image forming apparatus, and controls the exposure device 11, the high voltage power supply 96, the power control unit 97 and the driving device 98. Accordingly, the CPU 94 performs the formation of an electrostatic latent image, the transfer of a developed toner image, the fixing of a toner image to the paper P, etc., and controls an image formation process in which the exposure data is printed on the paper P as the toner image. Note that the image forming apparatus to which the present invention is applied is not limited to the image forming apparatus having the configuration described in FIG. 1, and may be an image forming apparatus that can print papers P having different widths, and that includes the fixing apparatus 50 including the heater 54, which will be described later.

[Fixing Apparatus]

Figure 3A:
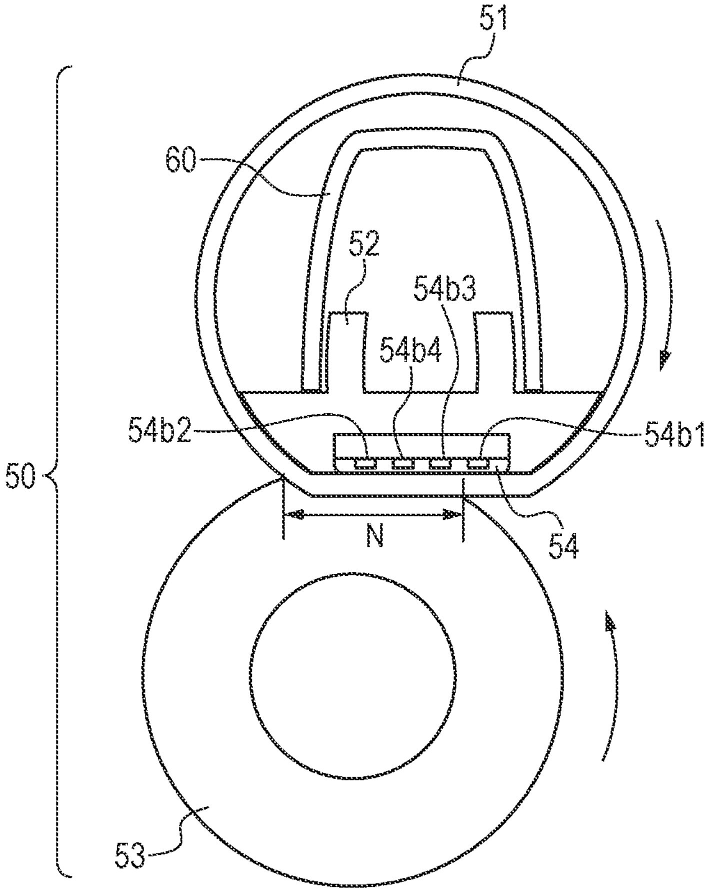
FIG. 3A and FIG. 3B are diagrams illustrating a fixing apparatus and a heater of Embodiments 1 to 3.
Figure 3B:
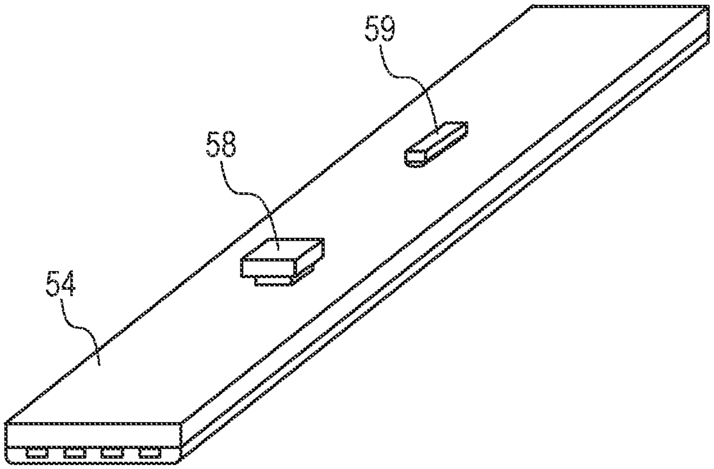

FIG. 3A illustrates a cross-section of the fixing apparatus 50 used in Embodiment 1. FIG. 3B illustrates a rear surface of the heater 54. Referring to FIG. 3A and FIG. 3B, the fixing apparatus 50 will be described below. The fixing apparatus 50 includes a cylindrical film 51, the pressure roller 53 forming the fixation nip portion N with the film 51, the heater 54, which is a heating member, a nip forming member 52 holding the heater 54, and a stay 60 for maintaining the strength in the longitudinal direction. The film 51, which is a first rotary member, includes a silicone rubber layer having a film thickness of 200 μm on a polyimide substrate having a film thickness of 50 μm, and a PFA release layer having a film thickness of 20 μm on the silicone rubber layer. The pressure roller 53, which is a second rotary member, includes an SUM cored bar having an outer diameter of 13 mm, a silicone rubber elastic layer having a film thickness of 3.5 mm on the SUM cored bar, and further includes a PFA release layer having a film thickness of 40 μm on the silicone rubber elastic layer. The pressure roller 53 is rotated by a driving source (not illustrated), and the film 51 performs the following rotation following the driving of the pressure roller 53.

The heater 54 is provided to contact the inner surface of the film 51, and is held by the nip forming member 52, and the inner periphery surface of the film 51 and the top surface of the heater 54 contact each other. Here, in the heater 54, the surface on which heat generation members 54*b*1 to 54*b*4 described later are provided is the top surface, and the surface on which a thermo switch 58, etc. described later is provided is the rear surface. The stay 60 is pressurized on both ends by a unit that is not illustrated, and the pressurizing force is received by the pressure roller 53 via the nip forming member 52 and the film 51. Accordingly, a fixation nip portion N at which the film 51 and the pressure roller 53 are pressed and contact each other is formed. The nip forming member 52 is required to have rigidity, heat resistance and thermal insulation properties, and is formed by a liquid crystal polymer. As illustrated in FIG. 3B, the thermo switch 58, which is a safety element, and the fixing temperature sensor 59 such as a thermistor, which is a temperature detecting unit, contact and are arranged on the rear surface of the heater 54.

The thermo switch 58 arranged on the rear surface of the heater 54 is, for example, a bimetal thermo switch, and the heater 54 and the thermo switch 58 are electrically connected to each other. When the thermo switch 58 detects that the temperature of the rear surface of the heater 54 has excessively risen (hereinafter referred to as the excessive temperature rise), a bimetal inside the thermo switch 58 is operated, and the power supplied to the heater 54 can be cut off. The fixing temperature sensor 59 arranged on the rear surface of the heater 54 is a chip resistor-type thermistor. The fixing temperature sensor 59 detects chip resistance, and the detection result is used for the temperature control of the heater 54. The fixing temperature sensor 59 can also detect the excessive temperature rise.

[Heater]

Figure 4:
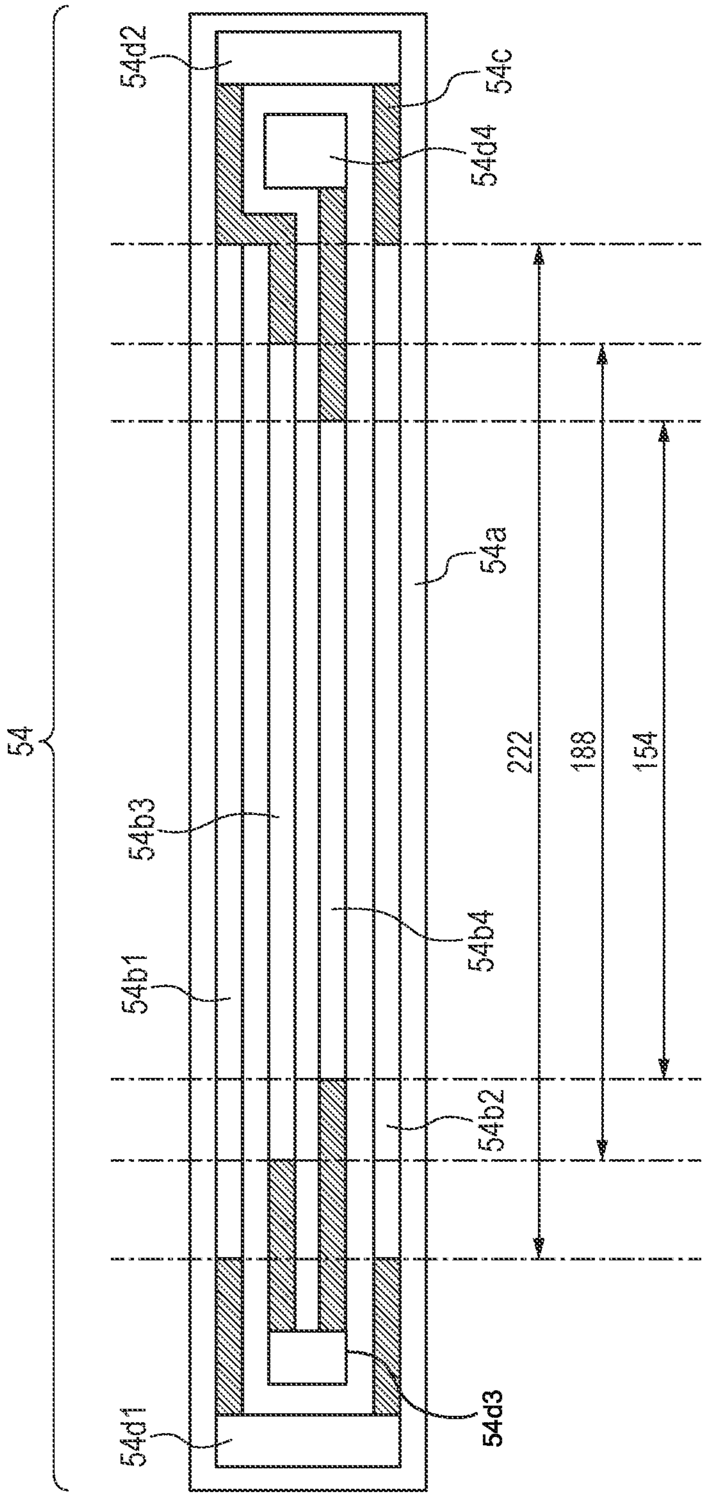
FIG. 4 is a diagram illustrating the heater of Embodiment 1.

The configuration of the heater 54 of Embodiment 1 is illustrated in FIG. 4, and the details will be described below. A substrate **54*a* is a plate-like ceramic substrate formed with alumina, etc., and the sizes are, for example, the thickness t=1 mm, the width W=6.3 mm, and the length l=280 mm. The heat generation members 54*b*1, 54*b*2, 54*b*3 and 54*b*4, a conductor 54*c*, which is an electric conduction route, and contacts 54*d*1, 54*d*2, 54*d*3 and 54*d*4 for supplying power are formed on the substrate 54*a* by a printing process. Hereinafter, the heat generation members 54*b*1 to 54*b*4 may be collectively referred to as the heat generation member 54*b*. In FIG. 4, the heat generation member 54*b* is indicated by white, the conductor 54*c* is indicated by hatched lines, and the contacts 54*d*1 to 54*d*4** are indicated by black.

The heat generation members **54*b* are arranged at equal intervals in the order of the heat generation member 54*b*1 having the longest length (hereinafter also referred to as the width) in the longitudinal direction, the heat generation member 54*b*3 having the second longest width, the heat generation member 54*b*4 having the third longest width, and the heat generation member 54*b*2 having the longest width. The heat generation member 54*b*1 and the heat generation member 54*b*2 have substantially the same width. The interval between the heat generation members 54*b* is, for example, 0.7 mm in Embodiment 1. The sizes of the heat generation members 54*b*1 and 54*b*2 are, for example, the thickness t=10 the width W=0.7 mm, and the length l=222 mm in Embodiment 1. The sizes of the heat generation member 54*b*3 are, for example, the thickness t=10 μm, the width W=0.7 mm, and the length l=188 mm in Embodiment 1. The sizes of the heat generation member 54*b*4** are, for example, the thickness t=10 μm, the width W=0.7 mm, and the length l=154 mm in Embodiment 1.

The heat generation members **54*b*1 and 54*b*2 have the length l=222 mm, and are used when printing an A4 size sheet having a width of 210 mm. The heat generation member 54*b*3 has the length l=188 mm, and is used when printing a B5 paper having a width of 182 mm. The heat generation member 54*b*4** has the length l=154 mm, and is used when printing an A5 paper having a width of 148.5 mm.

The heat generation member **54*b* is a conducting material containing silver and palladium as the main components, and a conducting material containing silver as the main component is used for the conductor 54*c* and the contacts 54*d*1 to 54*d*4. It is assumed that the electrical resistances across both ends of the heat generation members 54*b* in the longitudinal direction are 20Ω in both the longest heat generation members 54*b*1 and 54*b*2, 30Ω in the second longest heat generation member 54*b*3, and also 30Ω in the third longest heat generation member 54*b*4. One ends of the longest heat generation members 54*b*1 and 54*b*2 are electrically connected by the common contact 54*d*1, and the other ends are electrically connected by the common contact 54*d*2. Since the heat generation member 54*b*1 and the heat generation member 54*b*2 are connected in parallel, the combined electrical resistance of the longest heat generation members 54*b*1 and 54*b*2 between the contacts 54*d*1 and 54*d*2 is 10Ω. In this manner, the combined resistance of the heat generation member 54*b*1 and the heat generation member 54*b*2 is 10Ω, and is smaller than the resistance (30Ω) of the heat generation member 54*b*3 and the heat generation member 54*b*4**.

As described above, the heater 54 includes the heat generation member **54*b*1, which is a first heat generation member, and the heat generation member 54*b*2, which is a second heat generation member having substantially the same length as the heat generation member 54*b*1 in the longitudinal direction. Further, the heater 54 includes the heat generation member 54*b*3, which is a third heat generation member having a shorter length than the heat generation members 54*b*1 and 54*b*2 in the longitudinal direction, and the heat generation member 54*b*4, which is a fourth heat generation member. The heat generation member 54*b*1 is provided in one end of the substrate 54*a* in the width direction, and the heat generation member 54*b*2 is provided in the other end of the substrate 54*a* in the width direction. The heat generation members 54*b*3 and 54*b*4 are provided between the heat generation member 54*b*1 and the heat generation member 54*b*2 in the width direction of the substrate 54*a***.

Additionally, in Embodiment 1, the contact **54*d*1, which is a first contact, is the contact to which one ends of the heat generation members 54*b*1 and 54*b*2 are electrically connected. The contact 54*d*2, which is a second contact, is the contact to which the other ends of the heat generation member 54*b*1, the heat generation member 54*b*2, and the heat generation member 54*b*3 are electrically connected. The contact 54*d*3, which is a third contact, is the contact to which one ends of the heat generation member 54*b*3 and the heat generation member 54*b*4 are electrically connected. The contact 54*d*4, which is a fourth contact, is the contact to which the other end of the heat generation member 54*b*4** is electrically connected.

Note that, although all the widths W of the heat generation members **54*b* are the identical width of 0.7 mm in Embodiment 1, there are cases where the selection of material of a conducting material is difficult in order to form the heat generation members 54*b* having the same width W, depending on the performance required for the fixing apparatus 50. In that case, the widths W of the heat generation members 54*b* may be different according to the performance required for the fixing apparatus 50**.

(Regarding Heat Generation Members **54*b*1 and 54*b*2**)

The characteristics of the heat generation members **54*b*1 and 54*b*2 having the longest width in the above-described heater 54 will be described below. If the fixing apparatus 50 can quickly reach a sufficiently heated fixable state (hereinafter also referred to as the sheet feeding enabled state), a printed matter can be quickly provided to the user. Therefore, the power supply capability of the longest heat generation members 54*b*1 and 54*b*2 that can heat the entire area in the longitudinal direction can be maximized, so that any size of paper P may be chosen. The heat generation members 54*b*3 and 54*b*4 having the shorter lengths than the longest heat generation members 54*b*1 and 54*b*2 in the longitudinal direction are used after the fixing apparatus 50 is sufficiently heated by the longest heat generation members 54*b*1 and 54*b*2. Therefore, since the electric energy for fixing a toner image to the paper P at the time of sheet feeding may be supplemented, in a case where the heat generation members 54*b*3 and 54*b*4 are used, the heat generation members 54*b*3 and 54*b*4 can have lower power supply capability compared to the high power supply capability of the longest heat generation members 54*b*1 and 54*b*2**.

When the longest heat generation members **54*b*1 and 54*b*2 have the high power supply capability, it means that the deformation risk of the substrate 54*a* is high in a case where power is excessively supplied to the longest heat generation members 54*b*1 and 54*b*2 due to an unexpected apparatus failure. In Embodiment 1, the longest heat generation members include the two heat generation members 54*b*1 and 54*b*2, one heat generation member 54*b*1 is arranged on one end of the substrate 54*a* in the width direction, and the other heat generation member 54*b*2 is arranged on the other end of the substrate 54*a* in the width direction. Accordingly, the two longest heat generation members 54*b*1 and 54*b*2 are arranged so that they are symmetrical in the width direction of the substrate 54*a***.

Further, each of the heat generation members **54*b*1 and 54*b*2 is electrically connected to each other by the common contacts 54*d*1 and 54*d*2, and the two heat generation members 54*b*1 and 54*b*2 are configured such that power is always supplied substantially at the same time. Accordingly, since the both ends of the heater 54 in the width direction always generate heat when power is supplied to the longest heat generation members 54*b*1 and 54*b*2, the supplied electric energy can be distributed, and the temperature gradient of the substrate 54*a*** in the width direction can be reduced.

As described above, the fixing apparatus 50 can be made to reach the sheet feeding enabled state in a short time, and even if an unexpected apparatus failure occurs, and results in an excessive power supplying state, the temperature gradient of the substrate **54*a* in the width direction can be reduced, and the deformation risk of the substrate 54*a*** can be reduced.

(Regarding Heat Generation Members **54*b*3 and 54*b*4**)

Next, the characteristics of the two kinds of non-longest heat generation members **54*b*3 and 54*b*4 will be mentioned below. One ends of the heat generation member 54*b*3 and the heat generation member 54*b*4 are electrically connected to the one contact 54*d*3. On the other hand, in the heat generation member 54*b*3 and the heat generation member 54*b*4, the other end of the heat generation member 54*b*3 is electrically connected to the contact 54*d*2, and the other end of the heat generation member 54*b*4 is electrically connected to the contact 54*d*4. That is, the heat generation member 54*b*3 and the heat generation member 54*b*4** are configured so that either one of them will generate heat.

As described above, the heat generation member **54*b*3 is used at the time of printing of a B5 paper, and the heat generation member 54*b*4 is used at the time of printing of an A5 paper. The width (hereinafter referred to as the paper width) of the paper P and the lengths of the heat generation members 54*b*3 and 54*b*4 in the longitudinal direction are almost the same length, and the paper P passes through most of the area (hereinafter referred to as the heat generation area) in which the heat generation members 54*b*3 and 54*b*4 generate heat. Therefore, since most of the heat generated by the heat generation members 54*b*3 and 54*b*4 can be provided to the paper P, the temperature rise in the non-sheet feeding area through which the paper P does not pass can be suppressed. Accordingly, maintaining a high productivity is enabled. Additionally, since the longest heat generation members 54*b*1 and 54*b*2 are responsible for heating the fixing apparatus to the sheet feeding enabled state, the non-longest heat generation members 54*b*3 and 54*b*4 may supplement the electric energy for fixing a toner image to the paper P at the time of sheet feeding. Therefore, the power supply capability of the non-longest heat generation members 54*b*3 and 54*b*4 can be reduced, and the degree of temperature rise of the heat generation members 54*b*3 and 54*b*4** at the time of malfunction can be reduced.

Additionally, the above-described two kinds of heat generation members **54*b*3 and 54*b*4 are arranged between the longest heat generation member 54*b*1 and the longest heat generation member 54*b*2, and the heat generation members 54*b*3 and 54*b*4 are arranged close to the center of the substrate 54*a* in the width direction as much as possible. Accordingly, the temperature rise can be performed almost equally in either of a first end, which is one end of the substrate 54*a* in the width direction, and a second end, which is the other end of the substrate 54*a*, and the temperature gradient of the substrate 54*a*** in the width direction can be reduced.

As described above, the power supply capability of the non-longest heat generation members **54*b*3 and 54*b*4 is reduced, and the non-longest heat generation members 54*b*3 and 54*b*4 are arranged as symmetrically as possible in the width direction of the substrate 54*a*. Accordingly, even an unexpected apparatus failure results in an excessive power supplying state, since the temperature gradient in the width direction of the substrate 54*a* can be reduced, the deformation risk of the substrate 54*a* can be reduced. Additionally, by making the number of only the longest heat generation members 54*b*1 and 54*b*2 that require the high power supply capability two, and the number of the non-longest heat generation members 54*b*3 and 54*b*4 one, which is the minimally required number, while considering their symmetry in the width direction, the reduction of the size of the substrate 54*a*** can be achieved at the same time.

Comparison Examples

Figure 5:
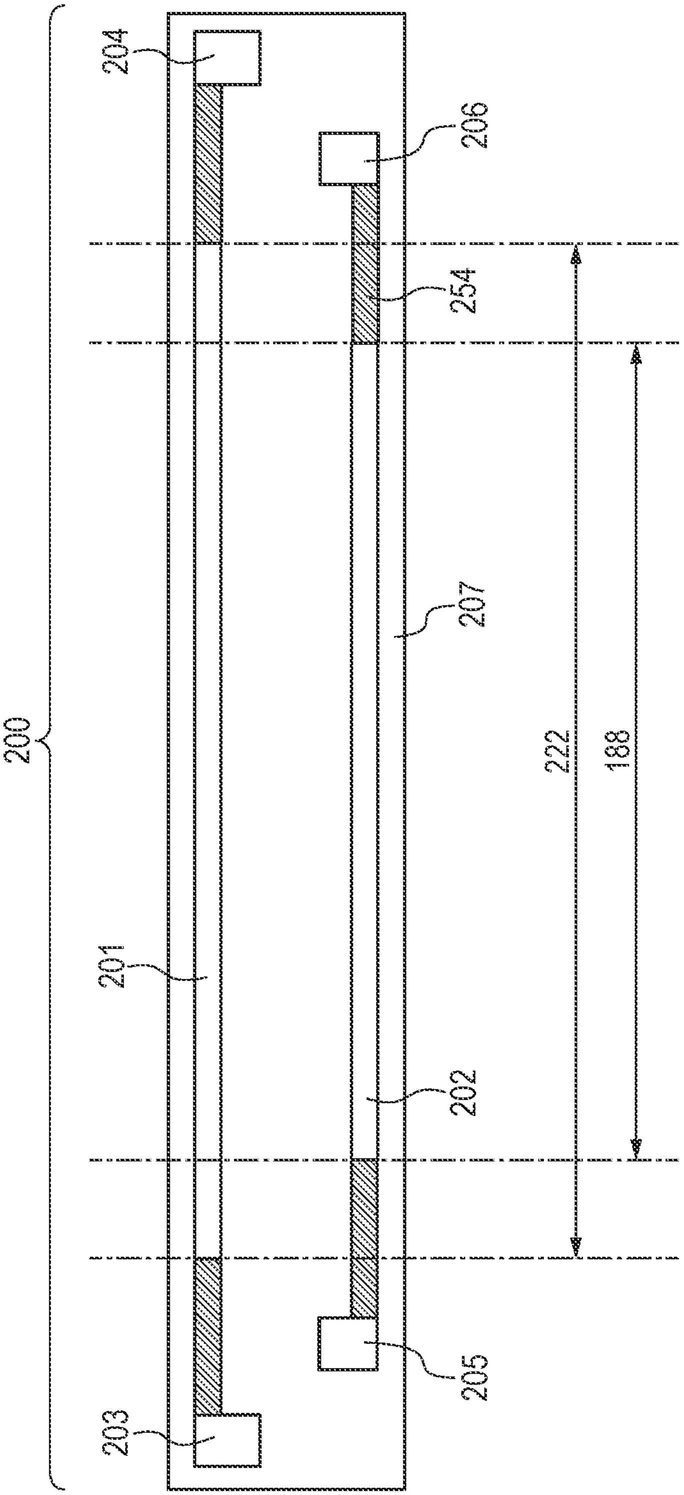
FIG. 5 is a diagram illustrating the heater of Comparison Example 1 for comparison with Embodiment 1.

FIG. 5 illustrates a heater 200 in Comparison Example 1, and the details of the configuration will be described below. A substrate 207 is a plate-like ceramic substrate formed with alumina, etc., and the sizes are, for example, the thickness t=1 mm, the width W=6.3 mm, and the length l=280 mm. Heat generation members 201 and 202, a conductor 254, and contacts 203, 204, 205 and 206 are formed on the substrate 207 by a printing process. In FIG. 5, the heat generation members 201 and 202 are indicated by white, the conductor 254 is indicated by hatched lines, and the contacts 203 to 206 are indicated by black.

In the heater 200, two heat generation members, i.e., the heat generation member 201 having the longest width and the heat generation member 202 having the second longest width, are arranged on the substrate 207 with an interval of 3.5 mm. The sizes of the heat generation member 201 are the thickness t=10 μm, the width W=0.7 mm, and the length l=222 mm. The sizes of the heat generation member 202 are the thickness t=10 μm, the width W=0.7 mm, and the length l=188 mm. The heat generation member 201 is used when printing an A4 (210 mm in the width) paper, and the heat generation member 202 is used when printing a B5 (182 mm) paper. The electrical resistances across both ends of the heat generation members 201 and 202 in the longitudinal direction are 10Ω in the longest heat generation member 201, and 30Ω in the second longest heat generation member 201. The both ends of the longest heat generation member 201 are electrically connected to the contacts 203 and 204 via the conductor 254, and the both ends of the second longest heat generation member 202 are electrically connected to the contacts 205 and 206 via the conductor 254.

Embodiment 1 and Comparison Example 1

Figure 6A:
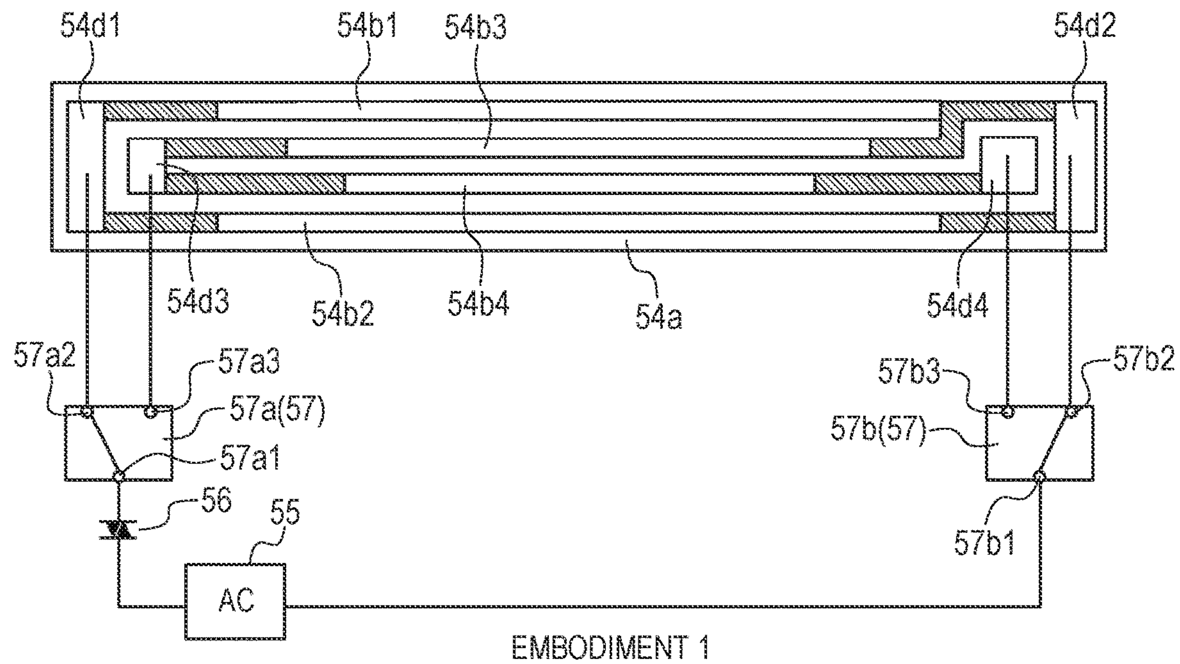
FIG. 6A is a diagram illustrating electric power supply to the heater of Embodiment 1.
Figure 6B:
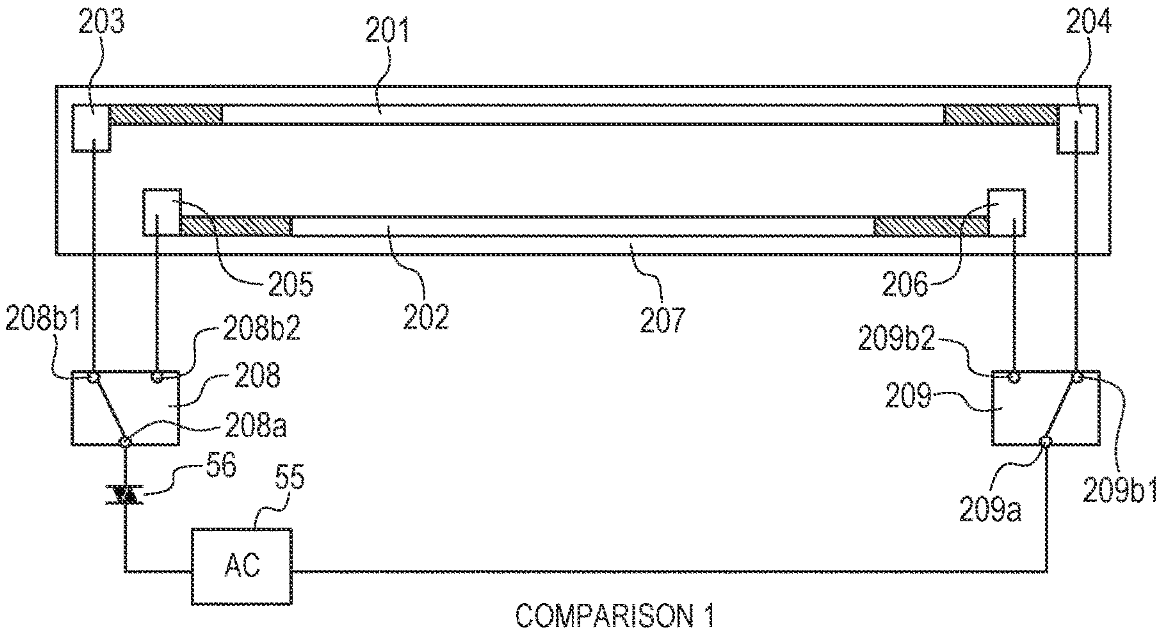
FIG. 6B is a diagram illustrating the electric power supply to the heater of Comparison Example 1.

FIG. 6A illustrates a power supplying circuit of Embodiment 1. FIG. 6B illustrates the power supplying circuit of Comparison Example 1. The comparison verification in these circuits to which Embodiment 1 and Comparison Example 1 are applied will be described. Each of the power supplying circuit will be described below. In Embodiment 1 of FIG. 6A, the contacts 54*d*1 to 54*d*4 are connected to a heat generation member switching device 57 for switching the power supply passages. Note that, since the heat generation member 54*b* that generates heat is switched by switching the power supply passages by the heat generation member switching device 57, the switching of the power supply passages is also expressed as the switching of the heat generation member 54*b*. In Embodiment 1, specifically, the heat generation member switching devices 57 are electromagnetic relays 57*a* and 57*b* having c-contact configurations.

The electromagnetic relay 57*a* includes a contact 57*a*1 connected to a first pole of an AC power supply 55 via a triac 56, a contact 57*a*2 connected to the contact 54*d*1, and a contact 57*a*3 connected to the contact 54*d*3. The electromagnetic relay 57*a* is brought into either one of the states, i.e., the state where the contact 57*a*1 and the contact 57*a*2 are connected to each other, and the state where the contact 57*a*1 and the contact 57*a*3 are connected to each other, by the control of the engine controller 92. The electromagnetic relay 57*b* includes a contact 57*b*1 connected to a second pole of the AC power supply 55, a contact 57*b*2 connected to the contact 54*d*2, and a contact 57*b*3 connected to the contact 54*d*4. The electromagnetic relay 57*b* is brought into one of the states, i.e., the state where the contact 57*b*1 and the contact 57*b*2 are connected to each other, and the state where the contact 57*b*1 and the contact 57*b*3 are connected to each other, by the control of the engine controller 92.

FIG. 6A illustrates the electromagnetic relays 57*a* and 57*b* at the time of non-operation, the contact 57*a*1 and the contact 57*a*2 are connected to each other in the electromagnetic relay 57*a*, and the contact 57*b*1 and the contact 57*b*2 are connected to each other in the electromagnetic relay 57*b*. Since power is supplied between the contact 54*d*1 and the contact 54*d*2 at the time of non-operation of the electromagnetic relays 57*a* and 57*b*, the longest heat generation members 54*b*1 and 54*b*2 generate heat.

In a case where the electromagnetic relays 57*a* and 57*b* are operated, the contact 57*a*1 and the contact 57*a*3 are connected to each other in the electromagnetic relay 57*a*, and the contact 57*b*1 and the contact 57*b*3 are connected to each other in the electromagnetic relay 57*b*. Since power is supplied between the contact 54*d*3 and the contact 54*d*4 at the time of operation of the electromagnetic relays 57*a* and 57*b*, only the heat generation member 54*b*4 generates heat. In a case where only the electromagnetic relay 57*a* is operated, it will be in a state where the contact 57*a*1 and the contact 57*a*3 are connected to each other in the electromagnetic relay 57*a*, and the contact 57*b*1 and the contact 57*b*2 are connected to each other in the electromagnetic relay 57*b*. Since power is supplied between the contact 54*d*3 and the contact 54*d*2 at the time of operation of only the electromagnetic relay 57*a*, only the heat generation member 54*b*3 generates heat.

In Comparison Example 1 of FIG. 6B, the contacts 203 to 206 are connected to electromagnetic relays 208 and 209 having the c-contact configurations, which are heat generation member switching devices for switching power supply passages. The electromagnetic relay 208 includes a contact 208*a* connected to the first pole of the AC power supply 55 via the triac 56, a contact 208*b*1 connected to the contact 203, and a contact 208*b*2 connected to the contact 205. The electromagnetic relay 208 is brought into either one of the states, i.e., the state where the contact 208*a* and the contact 208*b*1 are connected to each other, and the state where the contact 208*a* and the contact 208*b*2 are connected to each other, by the control of the engine controller 92. The electromagnetic relay 209 includes a contact 209*a* connected to the second pole of the AC power supply 55, a contact 209*b*1 connected to the contact 204, and a contact 209*b*2 connected to the contact 206. The electromagnetic relay 209 is brought into either one of the states, i.e., the state where the contact 209*a* and the contact 209*b*1 are connected to each other, and the state where the contact 209*a* and the contact 209*b*2 are connected to each other, by the control of the engine controller 92.

FIG. 6B illustrates the electromagnetic relays 208 and 209 at the time of non-operation, the contact 208*a* and the contact 208*b*1 are connected to each other in the electromagnetic relay 208, and the contact 209*a* and the contact 209*b*1 are connected to each other in the electromagnetic relay 209. Since power is supplied between the contact 203 and the contact 204 at the time of non-operation of the electromagnetic relays 208 and 209, the longest heat generation member 201 generates heat.

In a case where the electromagnetic relays 208 and 209 are operated, the contact 208*a* and the contact 208*b*2 are connected to each other in the electromagnetic relay 208, and the contact 209*a* and the contact 209*b*2 are connected to each other in the electromagnetic relay 209. Since power is supplied between the contact 205 and the contact 206 at the time of operation of the electromagnetic relays 208 and 209, only the heat generation member 202 generates heat. Note that a contact switch, such as an electromagnetic relay having the a-contact configuration, or an electromagnetic relay having the b-contact configuration may be used for the electromagnetic relay, or a contactless switch, such as a solid state relay (SSR), a photoMOS relay, and a triac, may be used for the electromagnetic relay.

Temperature Gradient of Embodiment 1 and Comparison Example 1

(i) In order to estimate the deformation amount of the substrate at the time when an excessive power is supplied to the heat generation member, the temperature profile of the back surface of the substrate (the position indicated by an A-A' line) after 3 seconds since the power was supplied was measured, in a case where AC voltage of 100V was continued to be supplied to the respective heat generation members of Embodiment 1 and Comparison Example 1. It is shown that the larger the difference between the maximum value and the minimum value of the temperature profile, the higher the deformation risk of the substrate.

Figure 7:
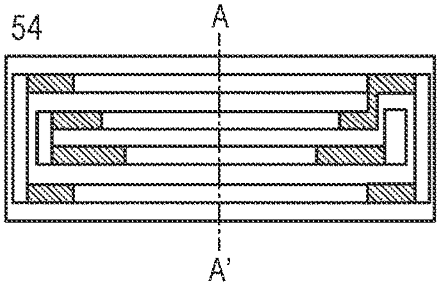
FIG. 7 is a diagram illustrating a comparison verification result 1 of Embodiment 1 and Comparison Example 1.
Figure 7:
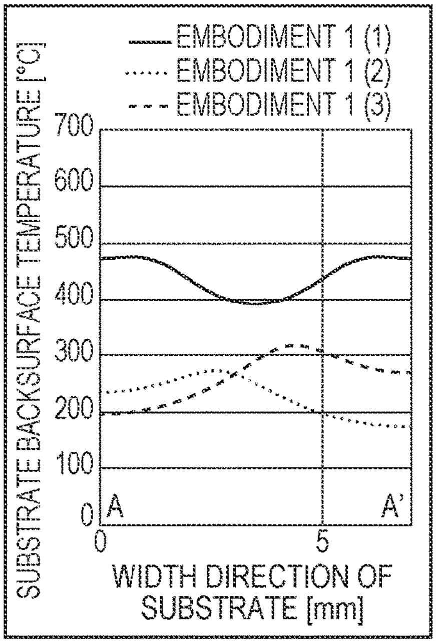
Figure 7:
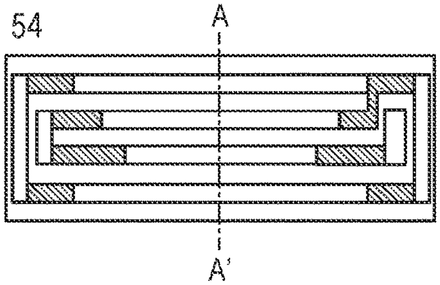
Figure 7:
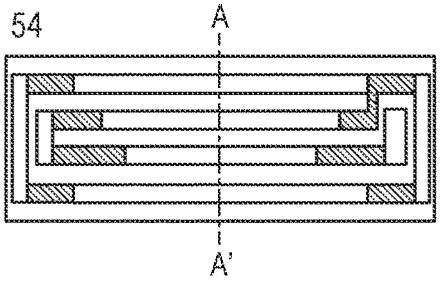
Figure 7:
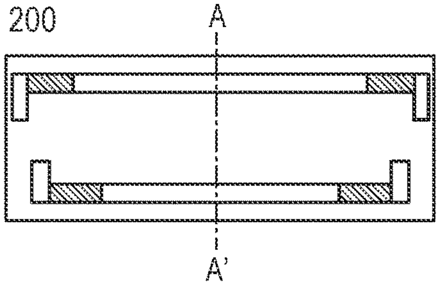
Figure 7:
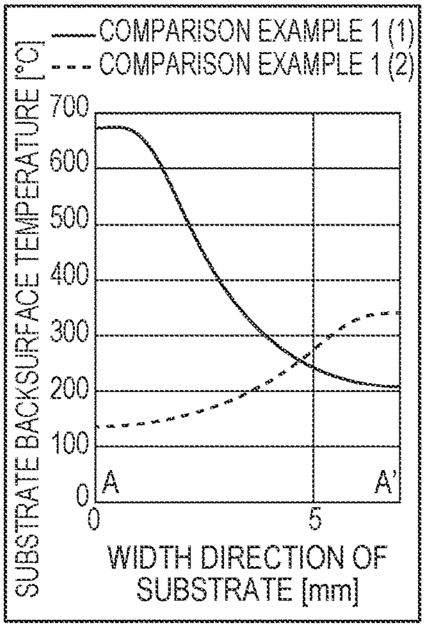
Figure 7:
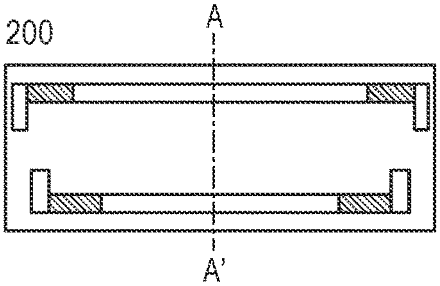

FIG. 7 illustrates Embodiment 1, Comparison Example 1, etc. in the first row, and illustrates the heat generation pattern of the heater in the second row. Note that the heat generation members to which power was supplied are indicated by vertical stripes. FIG. 7 illustrates the difference (hereinafter referred to as the temperature difference) between the maximum value and the minimum value of the temperature profile in the third row, and illustrates the temperature profile (substrate back surface temperature profile) of the back surface corresponding to the position indicated by the A-A' line of the substrate in the fourth row. In the graphs of the temperature profile, the horizontal axes represent the width direction (temperature width) [mm] of the substrate, and the vertical axes represent the temperature (substrate back surface temperature) [° C.]. Note that in the diagrams of the heat generation patterns, numerals are omitted for visibility.

Note that, in the graph of Embodiment 1, Embodiment 1 (1) is represented by a solid line, Embodiment 1 (2) is represented by a dotted line, and Embodiment 1 (3) is represented by a broken line. Additionally, in the graph of Comparison Example 1, Comparison Example 1 (1) is represented by a solid line, and Comparison Example 1 (2) is represented by a broken line.

Additionally, Embodiment 1 (1) represents a case where power is supplied to the two longest heat generation members **54*b*1 and 54*b*2 corresponding to an A4 size sheet. Embodiment 1 (2) represents a case where power is supplied to the second longest heat generation member 54*b*3 corresponding to a B5 paper. Embodiment 1 (3) represents a case where power is supplied to the shortest heat generation member 54*b*4 corresponding to an A5 paper. Comparison Example 1 (1) represents a case where power is supplied to the longest heat generation member 201 corresponding to an A4 size sheet, and Comparison Example 1 (2) represents a case where power is supplied to the second longest heat generation member 202** corresponding to a B5 paper.

Embodiment 1 (1)

In Embodiment 1 (1), the highest temperature of the back surface of the substrate **54*a* reached 472° C. near the heat generation member 54*b*1 or the heat generation member 54*b*2, and the lowest temperature was 391° C. between the two heat generation members 54*b*1 and 54*b*2. The difference between the highest temperature and the lowest temperature was 81° C., and the temperature gradient in the substrate 54*a* was small. In the configuration of Embodiment 1 (1), the two longest heat generation members 54*b*1 and 54*b*2 are used to distribute the electric energy, and are symmetrically arranged on the both ends of the substrate 54*a* in the width direction, and the two heat generation members 54*b*1 and 54*b*2 share the common contacts 54*d*1 and 54*d*2 to always generate heat at the same time. Accordingly, the temperature gradient generated in the substrate 54*a*** was able to be reduced.

Embodiment 1 (2)

In Embodiment 1 (2), the highest temperature of the back surface of the substrate **54*a* reached 271° C. near the heat generation member 54*b*3, and the lowest temperature was 174° C. at one end in the width direction, which is the farther end from the heat generation member 54*b*3. The difference between the highest temperature and the lowest temperature was 97° C., and the temperature gradient in the substrate 54*a* was small. Since the power supply capability of the second longest heat generation member 54*b*3 of Embodiment 1(2) is made to be the minimum value required, and the second longest heat generation member 54*b*3 is arranged in almost the center of the substrate 54*a* in the width direction to be symmetrical with the heat generation member 54*b*4 as much as possible, the temperature gradient generated in the substrate 54*a*** was able to be reduced.

Embodiment 1 (3)

In Embodiment 1 (3), the highest temperature of the back surface of the substrate **54*a* reached 316° C. near the heat generation member 54*b*4, and the lowest temperature was 196° C. at one end in the width direction, which is the farther end from the heat generation member 54*b*4. The difference between the highest temperature and the lowest temperature was 120° C. For the same reason as the reason described in the Embodiment 1 (2), the temperature gradient generated in the substrate 54*a*** was able to be reduced.

Comparison Example 1 (1)

In Comparison Example 1 (1), the highest temperature of the back surface of the substrate 207 reached 673° C. near the heat generation member 201, and the lowest temperature was 208° C. at one end in the width direction, which is the farther end from the heat generation member 201. The difference between the highest temperature and the lowest temperature was 465° C., and the temperature gradient in the substrate 207 was large. In Comparison Example 1 (1), since the number of the longest heat generation member 201 that gives the maximum power supply capability is one, and the longest heat generation member 201 is arranged at one end of the substrate 207 in the width direction, the increase in the temperature at the one end became large.

Comparison Example 1 (2)

In Comparison Example 1 (2), the highest temperature of the back surface of the substrate 207 reached 341° C. near the heat generation member 202, and the lowest temperature was 136° C. at one end in the width direction, which is the farther end from the heat generation member 202. The difference between the highest temperature and the lowest temperature was 205° C., and the temperature gradient in the substrate 207 was large. Since the heat generation member 202 has a low power supply capability compared with the heat generation member 201 of Comparison Example 1 (1), although the temperature gradient is smaller than that in Comparison Example 1 (1), the increase in the temperature at one end became large, since the heat generation member 202 is arranged at the one end of the substrate 207 in the width direction.

From the above, while the maximum temperature difference in Embodiment 1 is 120° C., which is shown in the Embodiment 1 (3), the maximum temperature difference in Comparison Example 1 is 465° C., which is shown in Comparison Example 1 (1), and the temperature difference in Comparison Example 1 is three or more times larger than that in Embodiment 1. The extension of the substrate is large in a portion with a high temperature, and the extension of the substrate is small in a portion with a low temperature, and the substrate is deformed due to the difference in the amount of extension. In Embodiment 1, it was able to confirm that, in any of the heat generation members **54*b*, the temperature difference was 120° C. or less, which is sufficiently small compared with that in Comparison Example 1, and the risk of deformation of the substrate 54*a*** was small. Even if the material of the substrate and the sizes of the substrate are changed, the same effects can be obtained by using the configuration illustrated in the Embodiment 1.

Productivity of Embodiment 1 and Comparison Example 1

Figure 8:
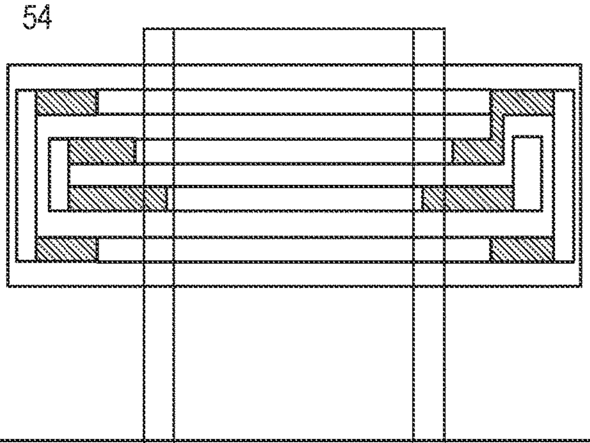
FIG. 8 is a diagram illustrating a comparison verification result 2 of Embodiment 1 and Comparison Example 1.
Figure 8:
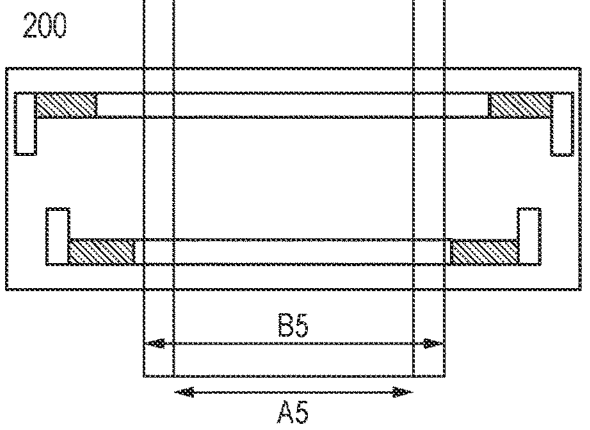

(ii) FIG. 8 illustrates the confirmation results of the maximum productivity for a B5 paper and an A5 paper in Embodiment 1 and Comparison Example 1. FIG. 8 illustrates Embodiment 1 and Comparison Example 1 in the first row, and illustrates the patterns of the heat generation member in the second row. The width of a B5 paper and the width of an A5 paper are also illustrated in the heat generation member patterns. FIG. 8 illustrates the maximum productivity at the time when B5 papers are continuously printed in the third row, and illustrates the maximum productivity at the time when A5 papers are continuously printed in the fourth row.

The conditions for an image forming apparatus and a fixing apparatus at the time of confirming the productivity will be mentioned. A paper P previously printed is hereinafter referred to as the preceding paper, and the subsequent paper printed subsequently to the paper P is hereinafter referred to as the subsequent paper. Additionally, the interval between the bottom end of the preceding paper and the top end of the subsequent paper is hereinafter also referred to as the paper interval. The image process speed of the image forming apparatus is 200 mm/sec, the interval (paper interval) between the preceding paper and the subsequent paper is 50 mm (0.4 second), and papers P having the same size are continuously fed while maintaining the maximum productivity. Sheet feeding is performed by performing the temperature control by the engine controller 92, so that the back surface of the substrate becomes 180° C. by the fixing temperature sensor 59 installed in the back surface of the substrate. As for the papers P, Canon CS680 having the B5 (182 mm in width×257 mm in length×92 μm in thickness, a basis weight of 68 $g/m^2$) size, and Canon PBPAPER having the A5 (148.5 mm in width×210 mm in length×83 μm in thickness, a basis weight of 64 $g/m^2$) size were used. Additionally, in a case where the temperature of the film 51 in the non-sheet feeding area through which the papers P do not pass at the time of sheet feeding is measured, and the temperature exceeds 200° C., the interval (paper interval) between the preceding paper and the subsequent paper is increased. The maximum productivity refers to the productivity at the time when the temperature of the film 51 becomes 200° C. or less.

Embodiment 1 includes the heat generation members **54*b*3 and 54*b*4 for a plurality of small sizes corresponding to the B5 and A5 papers, and the temperature rise of the film 51 is small for any of the papers P, and the adjustment of the paper interval is not required. In Embodiment 1, the maximum productivity for the B5 paper was 39 sheets/minute, and the maximum productivity for the A5 paper was 46 sheets/minute. On the other hand, in Comparison Example 1, since only one kind of heat generation member 202 corresponding to the B5 paper is provided as the heat generation member, when printing B5 papers, the adjustment of the paper interval was not required, and the maximum productivity was 39 sheets/minute. However, since the heat generation member 202 corresponding to the B5 paper is used even when printing A5 papers, the temperature rise of the film 51** was large, and it was necessary to increase the paper interval so that the temperature rise in the non-sheet feeding portion will not occur, and it was found that the maximum productivity was as low as 16 sheets/minute.

As described above, according to Embodiment 1, since the heat generation member having a first length includes two heat generation members, i.e., a first heat generation member and a second heat generation member, the power provided to the heat generation member having the first length can be distributed. Additionally, since the power is always supplied to the first heat generation member and the second heat generation member at the same time, the temperature rise does not unevenly occur only in one end of the substrate in the width direction. Accordingly, assuming an unexpected apparatus failure, even if an electric power is excessively supplied to the heat generation member having the first length, the temperature gradient generated in the substrate in the width direction can be reduced. The fact that the temperature gradient is small enables the reduction of distortion (heat stress) generated in the substrate, and the deformation of the substrate can be suppressed.

Next, the power supply capability of a third heat generation member and a fourth heat generation member having the lengths shorter than the first length in the longitudinal direction, and having different lengths in the longitudinal direction is made smaller than that of the heat generation member having the first length. Then, the third heat generation member and the fourth heat generation member are arranged between the first heat generation member and the second heat generation member in the width direction of the substrate, and the symmetry in the width direction of the substrate is maintained as much as possible. Accordingly, assuming an unexpected apparatus failure, even if an electric power is excessively supplied to one of the third heat generation member and the fourth heat generation member, the temperature gradient generated in the substrate in the width direction can be reduced, and the deformation of the substrate due to distortion can be suppressed. Then, since the third heat generation member and fourth heat generation member having the lengths shorter than the first length in the longitudinal direction, and having different lengths in the longitudinal direction are provided, the productivity for a plurality of kinds of papers having narrow widths can be improved. Finally, the reduction of the sizes of the heater can also be achieved at the same time by including two heat generation members only for the heat generation members having the first length, and including one heat generation member for each of the other heat generation members having shorter lengths in the longitudinal direction.

Modification 1

Figure 9A:
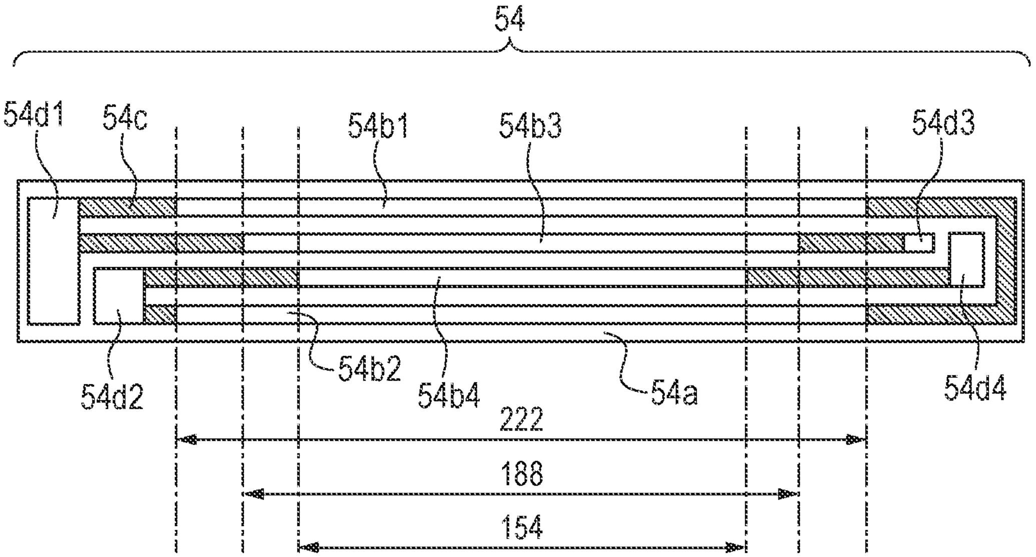
FIG. 9A and FIG. 9B are diagrams illustrating modifications of the heater of Embodiment 1.
Figure 9B:
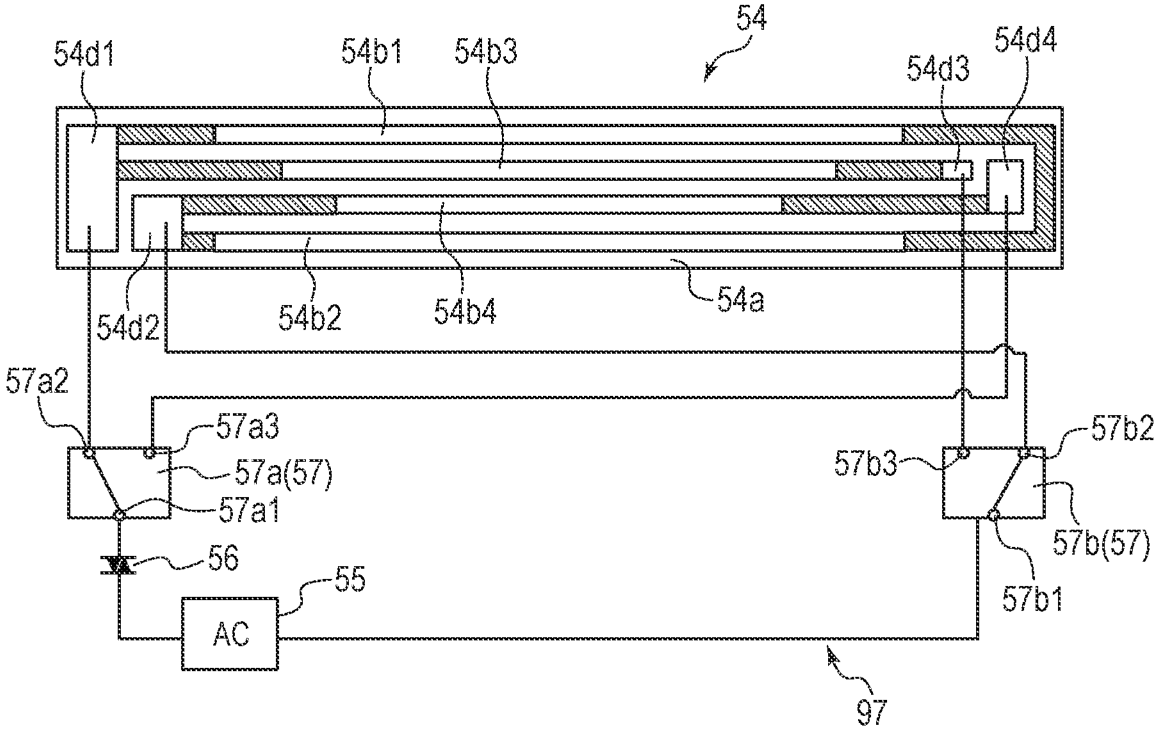

In Embodiment 1, although the details have been described about the configuration in which the two longest heat generation members **54*b*1 and 54*b*2 are electrically connected in parallel, and the power is supplied to the two longest heat generation members 54*b*1 and 54*b*2 at the same time, the configuration is not limited to this configuration. FIG. 9A is a diagram illustrating the configuration of the heater 54, and FIG. 9B is a diagram illustrating the heater 54 and the power control unit 97. As illustrated in FIG. 9A, the heater may be a heater in which the first contact 54*d*1, the first heat generation member 54*b*1, the second heat generation member 54*b*2, and the second contact 54*d*3 are electrically connected in series in this order. Specifically, in the heat generation member 54*b*1, one end is connected to the contact 54*d*1, and the other end is connected to the other end of the heat generation member 54*b*2 via the conductor 54*c* without any contacts. In the heat generation member 54*b*2, one end is connected to the contact 54*d*3, and the other end is connected to the other end of the heat generation member 54*b*1 via the conductor 54*c* without any contacts. In the heat generation member 54*b*3, one end is connected to the contact 54*d*1, and the other end is connected to the contact 54*d*3. In the heat generation member 54*b*4, one end is connected to the contact 54*d*3, and the other end is connected to the contact 54*d*4**.

As illustrated in FIG. 9B, the electromagnetic relay **57*a* includes the contact 57*a*1 connected to the first pole of the AC power supply 55 via the triac 56, the contact 57*a*2 connected to the contact 54*d*1, and the contact 57*a*3 connected to the contact 54*d*4. The electromagnetic relay 57*a* is brought into either one of the states, i.e., the state where the contact 57*a*1 and the contact 57*a*2 are connected to each other, and the state where the contact 57*a*1 and the contact 57*a*3 are connected to each other, by the control of the engine controller 92. The electromagnetic relay 57***b* includes the contact 57*b*1 connected to the second pole of the AC power supply 55, the contact 57*b*2 connected to the contact 54*d*2, and the contact 57*b*3 connected to the contact 54*d*3. The electromagnetic relay 57*b* is brought into either one of the states, i.e., the state where the contact 57*b*1 and the contact 57*b*2 are connected to each other, and the state where the contact 57*b*1 and the contact 57*b*3 are connected to each other, by the control of the engine controller 92.

FIG. 9A illustrates the electromagnetic relays 57*a* and 57*b* at the time of non-operation, the contact 57*a*1 and the contact 57*a*2 are connected to each other in the electromagnetic relay 57*a*, and the contact 57*b*1 and the contact 57*b*2 are connected to each other in the electromagnetic relay 57*b*. At the time of non-operation of the electromagnetic relays 57*a* and 57*b*, since power is supplied between the contact 54*d*1 and the contact 54*d*2, the longest heat generation members 54*b*1 and 54*b*2 generate heat.

In a case where only the electromagnetic relay 57*b* is operated, the contact 57*a*1 and the contact 57*a*2 are connected to each other in the electromagnetic relay 57*a*, and the electromagnetic relay 57*b* is brought into the state where the contact 57*b*1 and the contact 57*b*3 are connected to each other. At the time of operation of only the electromagnetic relay 57*b*, since power is supplied between the contact 54*d*1 and the contact 54*d*3, only the heat generation member 54*b*3 generates heat. In a case where only the electromagnetic relay 57*a* is operated, the contact 57*a*1 and the contact 57*a*3 are connected to each other in the electromagnetic relay 57*a*, and the electromagnetic relay 57*b* is brought into the state where the contact 57*b*1 and the contact 57*b*2 are connected to each other. At the time of operation of only the electromagnetic relay 57*a*, since power is supplied between the contact 54*d*4 and the contact 54*d*2, only the heat generation member 54*b*4 generates heat.

As described above, in FIG. 9A and FIG. 9B of the modification, one ends of the heat generation member 54*b*1 and the heat generation member 54*b*3 are electrically connected to the contact 54*d*1, which is the first contact. One ends of the heat generation member 54*b*4 and the heat generation member 54*b*2 are electrically connected to the contact 54*d*2, which is the second contact. The other end of the heat generation member 54*b*3 is electrically connected to the contact 54*d*3, which is the third contact. The other end of the heat generation member 54*b*4 is electrically connected to the contact 54*d*4, which is the fourth contact. Then, the other end of the heat generation member 54*b*1 and the other end of the heat generation member 54*b*2 are electrically connected to each other.

Also in the configuration of FIG. 9A and FIG. 9B, since it is the configuration in which power is supplied to the longest heat generation members 54*b*1 and 54*b*2 at the same time, the same effects as those in Embodiment 1 are exhibited. The suppliable power to the longest heat generation members 54*b*1 and 54*b*2 can be made equivalent to that in Embodiment 1, and the electrical resistance across both ends of each of the first heat generation member 54*b*1 and the second heat generation member 54*b*2, which are the longest heat generation members, may be 552. In FIG. 9A and FIG. 9B, the heat generation member 54*b*1 and the heat generation member 54*b*2 are connected in series, and the combined resistance value is 10Ω. The other heat generation members may be the same as those in Embodiment 1. In this manner, also in Modification 1, the combined resistance of the heat generation member 54*b*1 and the heat generation member 54*b*2 is 10Ω, and is smaller than the resistances (30Ω) of the heat generation member 54*b*3 and the heat generation member 54*b*4. The effects exhibited by the heater 54 illustrated in FIG. 9A and FIG. 9B are the same as those in Embodiment 1.

Modification 2

In Embodiment 1, although the details have been described about the case where the number of the non-longest heat generation members 54*b*3 and 54*b*4 are two, the configuration is not limited to this configuration. For example, as illustrated in FIG. even with the configuration in which the number of the non-longest heat generation members is three, the same effects described in Embodiment 1 can be exhibited. That is, Modification 2 includes a heat generation member 54*b*5, which is a fifth heat generation member whose length in the longitudinal direction is shorter than that of the heat generation member 54*b*4, which is the fourth heat generation member. In the heat generation member 54*b*1 and the heat generation member 54*b*2, one ends are connected to the contact 54*d*1, which is a first common contact, and the other ends are connected to the contact 54*d*2, which is a second common contact. In the heat generation member 54*b*3, one end is connected to the contact 54*d*3, which is the third contact, and the other end is connected to the contact 54*d*2. In the heat generation member 54*b*4, one end is connected to the contact 54*d*4, which is the fourth contact, and the other end is connected to the contact 54*d*2. In the heat generation member 54*b*5, one end is connected to the contact 54*d*5, which is a fifth contact, and the other end is connected to the contact 54*d*2. That is, the other ends of all the heat generation members 54*b*1 to 54*b*5 are connected to the contact 54*d*2. Additionally, the three heat generation members 54*b*3 to 54*b*5 are arranged between the two heat generation members 54*b*1 and 54*b*2 in the width direction of the substrate 54*a*. Further, the heat generation member 54*b*5 is arranged between the heat generation members 54*b*3 and 54*b*4 in the width direction of the substrate 54*a*.

Figure 10:
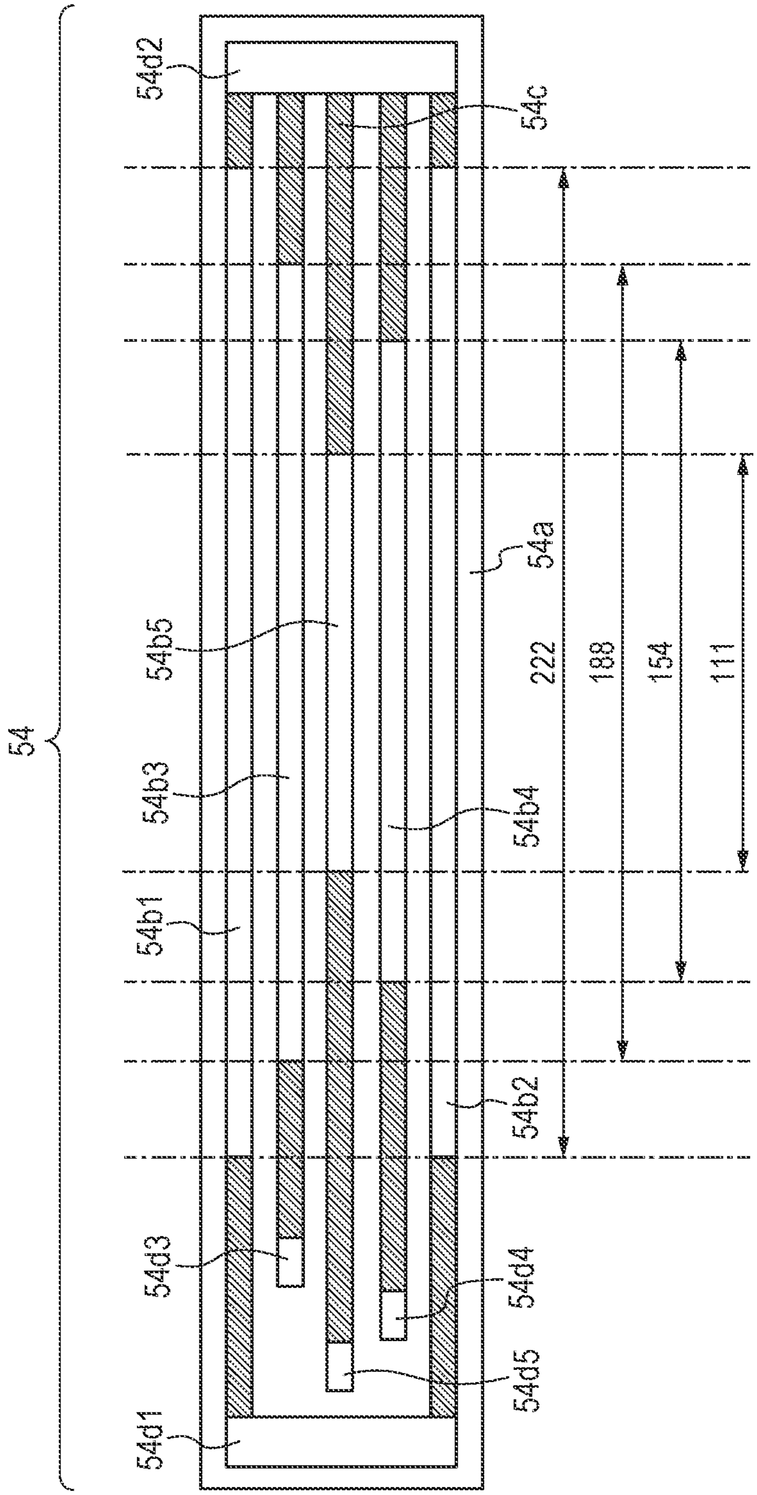
FIG. 10 is a diagram illustrating a modification of the heater of Embodiment 1.

The heater 54 illustrated in FIG. 10 will be described. The longest heat generation members 54*b*1 and 54*b*2 are arranged on the both ends of the substrate 54*a* in the width direction, and power is supplied from the common contacts 54*d*1 and 54*d*2 to the longest heat generation members 54*b*1 and 54*b*2 at the same time. As in Embodiment 1, the electrical resistance across both ends of each of the longest heat generation members 54*b*1 and 54*b*2 is set to 20[Ω]. The lengths of the heat generation members 54*b*1 and 54*b*2 in the longitudinal direction are 222 mm.

The lengths in the longitudinal direction are 188 mm in the heat generation member 54*b*3, 154 mm in the heat generation member 54*b*4, and 111 mm in the heat generation member 54*b*5. The heat generation member 54*b*3 is used at the time of printing of a B5 paper, the heat generation member 54*b*4 is used for printing of an A5 paper, and the heat generation member 54*b*5 is used at the time of printing of an A6 paper. The electrical resistance across both ends of each of these non-longest heat generation members 54*b*3 to 54*b*5 is set to 30[Ω]. In this manner, also in Modification 2, the combined resistance of the heat generation member 54*b*1 and the heat generation member 54*b*2 is 10Ω, and is smaller than the resistances (30Ω) of the heat generation member 54*b*3 to the heat generation member 54*b*5. By increasing the number of kinds of the non-longest heat generation members to three, the maximization of the productivity for the three kinds of papers, a B5 paper, an A5 paper and an A6 paper, is enabled.

In the non-longest heat generation members, assuming an excessive electric power supply, the power supplied to each of the heat generation members 54*b*3 to 54*b*5 is the same. Since the length of the heat generation member 54*b*5 in the longitudinal direction is the shortest, the degree of concentration of power is the highest, and the deformation risk of the substrate 54*a* at the time of temperature rise is high. For the purpose of removing this risk as much as possible, the shortest heat generation member 54*b*5 can be arranged in the center portion in the width direction of the substrate 54*a* to give the symmetry in the width direction. Additionally, the heat generation members 54*b*3 and 54*b*4 can be arranged on both sides of the heat generation member 54*b*5 in the width direction, to be close to the center as much as possible. The effects exhibited by the heater 54 illustrated in FIG. 10 are the same as those in Embodiment 1.

Modification 3

In Modification 2, four contacts are arranged at one end of the substrate 54*a* in the longitudinal direction, and one contact is arranged at the other end. In Modification 3, an example will be described in which three contacts are arranged at one end in the longitudinal direction, and two contacts are arranged at the other end. In Modification 3, since the heat generation member can be arranged in the center in the longitudinal direction of the substrate 54*a* to the utmost, it is an arrangement preferable for making the heat generation distribution in the longitudinal direction uniform.

Modification 3 includes the heat generation member 54*b*5, which is the fifth heat generation member whose length in the longitudinal direction is shorter than that of the heat generation member 54*b*4, which is the fourth heat generation member. In the heat generation member 54*b*1 and the heat generation member 54*b*2, one ends are connected to the contact 54*d*1, which is the first common contact, and the other ends are connected to the contact 54*d*2, which is the second common contact. In the heat generation member 54*b*3, one end is connected to the contact 54*d*3, which is the third contact, and the other end is connected to the contact 54*d*2. In the heat generation member 54*b*4, one end is connected to the contact 54*d*3, and the other end is connected to the contact 54*d*4, which is the fourth contact. In the heat generation member 54*b*5, one end is connected to the contact 54*d*5, which is the fifth contact, and the other end is connected to the contact 54*d*4. Among the five heat generation members, the first heat generation member 54*b*1 and the second heat generation member 54*b*2 having the longest length, and the fourth heat generation member 54*b*3 having the second longest length are connected to the second contact 54*d*2. The fourth heat generation member 54*b*3 having the second longest length, and the fourth heat generation member 54*b*4 having the third longest length are connected to the third contact 54*d*3. The fourth heat generation member 54*b*4 having the third longest length, and the fifth heat generation member 54*b*5 having the fourth longest length are connected to the fourth contact 54*d*4. That is, the heat generation member 54*b* is connected to the contact common to another heat generation member 54*b* with which the difference in length from the heat generation member 54*b* is the minimum. Additionally, the three heat generation members 54*b*3 to 54*b*5 are arranged between the two heat generation members 54*b*1 and 54*b*2 in the width direction of the substrate 54*a*. Further, the heat generation member 54*b*5 is arranged between the heat generation members 54*b*3 and 54*b*4 in the width direction of the substrate 54*a*.

Figure 11:
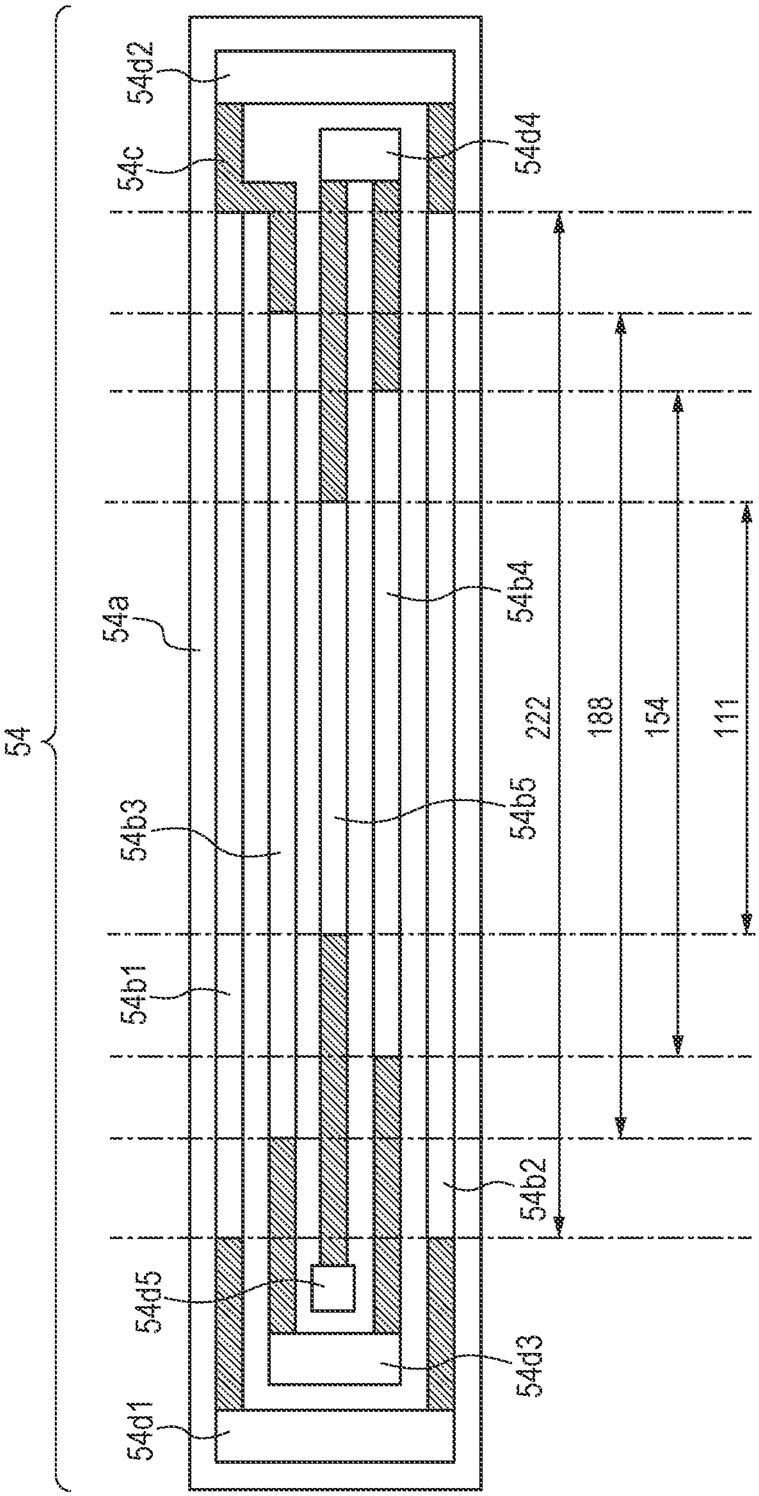
FIG. 11 is a diagram illustrating a modification of the heater of Embodiment 1.

The heater 54 illustrated in FIG. 11 will be described. The longest heat generation members 54*b*1 and 54*b*2 are arranged on the both ends of the substrate 54*a* in the width direction, and power is supplied from the common contacts 54*d*1 and 54*d*2 to the longest heat generation members 54*b*1 and 54*b*2 at the same time. As in Embodiment 1, the electrical resistance across both ends of each of the longest heat generation members 54*b*1 and 54*b*2 is set to 20[Ω]. The lengths of the heat generation members 54*b*1 and 54*b*2 in the longitudinal direction are 222 mm.

The lengths in the longitudinal direction are 188 mm in the heat generation member 54*b*3, 154 mm in the heat generation member 54*b*4, and 111 mm in the heat generation member 54*b*5. The heat generation member 54*b*3 is used at the time of printing of a B5 paper, the heat generation member 54*b*4 is used for printing of an A5 paper, and the heat generation member 54*b*5 is used at the time of printing of an A6 paper. The electrical resistance across both ends of each of these non-longest heat generation members 54*b*3 to 54*b*5 in the longitudinal direction is set to 30[Ω]. In this manner, also in Modification 3, the combined resistance of the heat generation member 54*b*1 and the heat generation member 54*b*2 is 10Ω, and is smaller than the resistances (30Ω) of the heat generation member 54*b*3 to the heat generation member 54*b*5. By increasing the number of kinds of the non-longest heat generation members to three, the maximization of the productivity for the three kinds of papers, a B5 paper, an A5 paper and an A6 paper, is enabled.

Assuming an excessive electric power supply in the non-longest heat generation members 54*b*, the power supplied to each of the heat generation members 54*b*3 to 54*b*5 is the same. Since the length of the heat generation member 54*b*5 in the longitudinal direction is the shortest, the degree of concentration of power is the highest, and the deformation risk of the substrate 54*a* at the time of temperature rise is high. For the purpose of removing this risk as much as possible, the shortest heat generation member 54*b*5 can be arranged in the center portion in the width direction of the substrate 54*a* to give the symmetry in the width direction. Additionally, the heat generation members 54*b*3 and 54*b*4 can be arranged on both sides of the heat generation member 54*b*5 in the width direction, to be close to the center as much as possible. The effects exhibited by the heater 54 illustrated in FIG. 11 are the same as those in Embodiment 1.

Conventionally, the resistance of each of a plurality of heat generation members has the same resistance value, and the suppliable power is also the same. Conventionally, in a case where power is continuously supplied to a heat generation member having a wide width, an excessive temperature rise occurs in one end of a substrate in the width direction. Therefore, the temperature gradient in the substrate becomes large, and there is a possibility that the substrate is greatly distorted. Additionally, conventionally, since only one kind of a heat generation member having a narrow width is provided, in papers having a plurality of kinds of sizes, it is difficult to suppress the temperature rise in the non-sheet feeding area, and it is difficult to provide a high productivity. On the other hand, according to Embodiment 1, the deformation of a substrate on which a heater is mounted can be suppressed.

Embodiment 2

Since the shape of the heater 54 of Embodiment 2 is the same as that in Embodiment 1, and is as illustrated in FIG. 4, a description will be omitted. In Embodiment 2, among the non-longest heat generation members 54*b*3 and 54*b*4, the power density (described later) of the shorter heat generation member **54*b*4 is made higher than the power density of the longer heat generation member 54*b*3. The non-longest heat generation members 54*b*3 and 54*b*4 have a large non-heating area that cannot be heated in the longitudinal direction. The shorter the length in the longitudinal direction of the heat generation member 54*b* is, the wider this non-heating area becomes, and the heat of the heat generation member 54*b* is easily taken away by the non-heating area. The fixing apparatus 50 cannot sufficiently perform heating in the vicinity of this non-heating area, and there is a possibility that a toner image cannot be fixed to the paper P. Therefore, at least the power density of the shorter heat generation member 54*b*4 can be made higher than the power density of the longer heat generation member 54*b*3**.

Additionally, among the non-longest heat generation members **54*b*3 and 54*b*4, the resistance value of the shorter heat generation member 54*b*4 is made to be equal to or higher than the resistance value of the longer heat generation member 54*b*3. Accordingly, the fixing apparatus 50 can be operated with a certain current amount or less, irrespective of whether the shorter heat generation member 54*b*4 or the longer heat generation member 54*b*3 is used. Accordingly, low rating and low cost wires, elements, etc. can be chosen for bundled wires, electric elements, etc. to be connected to the non-longest heat generation members 54*b*3 and 54*b*4**.

Here, the power density is defined as the value (in the unit of W/mm) obtained by dividing the power generated when 100V is provided to the heat generation member **54*b* by the length of the heat generation member 54*b* in the longitudinal direction. Let the electric resistance value of the longer heat generation member 54*b*3 be R1, the electric resistance value of the shorter heat generation member 54*b*4 be R2, the length of the longer heat generation member 54*b*3 in the longitudinal direction be L1, and the length of the shorter heat generation member 54*b*4 in the longitudinal direction be L2. In that case, the power of the longer heat generation member 54*b*3 is expressed by "$100^2/R1$", and the power of the shorter heat generation member 54*b*4 is expressed by "$100^2/R2$." Since the respective powers are divided by the length of the heat generation member 54*b*, the power density of the longer heat generation member 54*b*3 is expressed by "$100^2/R1/L1$", and the power density of the shorter heat generation member 54*b*4** is expressed by "$100^2/R2/L2$." Embodiment 2 has the characteristic in the relationship "$100^2/R1/L1<100^2/R2/L2$." This relational expression can also be expressed as "R1L1>R2L2."

[Power Density and Whether or not Fixing can be Performed]

The power density of the heat generation member **54*b*, and the confirmation conditions for confirming whether fixing of a toner image to the paper P can be performed will be described below. The image process speed of an image forming apparatus is 200 mm/sec, and the interval (paper interval) between the preceding paper and the subsequent paper is set to 0.25 second. Sheet feeding is performed by performing the temperature control by the engine controller 92, so that the back surface of the substrate 54*a* becomes 180° C. by the fixing temperature sensor 59 installed in the back surface of the substrate 54*a*. Note that the fixing apparatus 50 including the heater 54** is kept in the state where it is sufficiently cooled.

Among the non-longest heat generation members **54*b*3 and 54*b*4, when using the longer heat generation member 54*b*3, Canon CS680 paper having the B5 (182 mm in width×257 mm in length×92 μm in thickness, a basis weight of 68 g/m$^2$) size is used. When using the shorter heat generation member 54*b*4**, the above-described CS680 paper is cut into the A5 size (148.5 mm in width×210 mm in length×92 μm in thickness, a basis weight of 68 g/m$^2$), and feeding of 10 papers are continuously performed in any case. Note that the toner image on the paper P is uniformly formed in the entire area of the paper P (each of the top margin, the bottom margin, the left margin, and the right margin is set to 5 mm), and a toner amount is 1.0 mg/cm 2.

Whether or not there is a portion in which the toner image on the paper P is unfixed is confirmed, and the case where all is fixed is considered to have no fixability problem and indicated by "○", and the case where there is an unfixed portion is considered to have a fixation failure and indicated by "x". The fixability is confirmed for the five kinds of longer heat generation members **54*b*3 having different power densities, and for the five kinds of shorter heat generation members 54*b*4** having different power densities. The confirmation results are illustrated in Table 1.

TABLE 1

| heat generation member length | power density | fixability |
|---|---|---|
| longer heat generation member | | |
| 188 | 1.90 | pass |
| 188 | 1.77 | pass |
| 188 | 1.72 | pass |
| 188 | 1.66 | fail |
| 188 | 1.56 | fail |
| shorter heat generation member | | |
| 154 | 2.03 | pass |
| 154 | 1.91 | pass |
| 154 | 1.80 | pass |
| 154 | 1.76 | fail |
| 154 | 1.71 | fail |

In Table 1, the left side table illustrates the longer heat generation member **54*b*3, and the right side table illustrates the shorter heat generation member 54*b*4. In each table, the length of the heat generation member 54*b*** in the longitudinal direction is shown in the first row, the power density is shown in the second row, and the above-described fixability (○ or x) is shown in the third row.

As illustrated in Table 1, in the longer heat generation member **54*b*3, the entire toner image was fixed to the paper P with the power density of 1.72 [W/mm] or more, and there was no problem in the fixability. Additionally, in the shorter heat generation member 54*b*4, the entire toner image was fixed to the paper P with the power density of 1.8 [W/mm] or more, and there was no fixability problem. Further, it was able to confirm that the heat generation member 54*b*4, having a larger non-heating area in which heat is easily taken away by the non-heating area near the ends of the heat generation member 54*b*4, and having a shorter length in the longitudinal direction, required a higher power density compared with the heat generation member 54*b*3**.

[Maximum Current Amount and Whether or not Fixing can be Performed]

Figure 12:
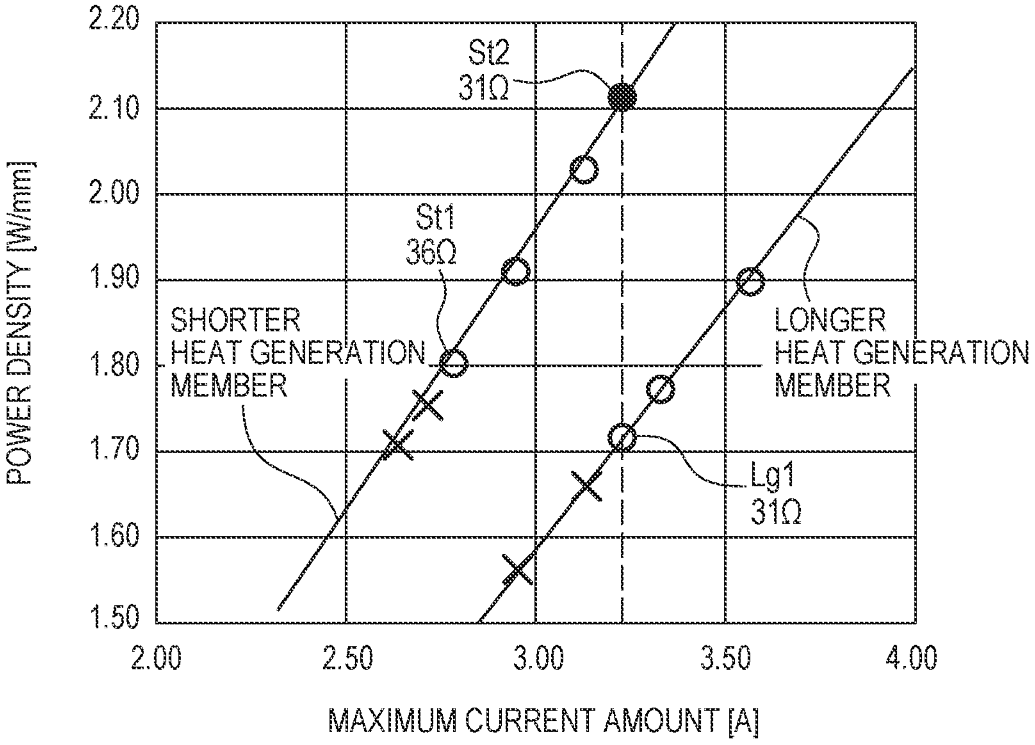
FIG. 12 is a graph illustrating the relationship between the maximum current amount and the power density of Embodiment 2.

Here, the maximum current amount refers to the current amount that flows when 100V is applied to the heat generation member **54*b*. The smaller the value of this maximum current amount is, the more it is enabled to choose low cost and low rating wires, elements, etc. for bundled wires, electric elements, etc. to be connected to the heat generation member 54*b*. FIG. 12** illustrates the relationship between the maximum current amount [A] and the power density [W/mm], and indicates the cases without a fixability problem with "○", and the cases with a fixation failure with "x".

In the longer heat generation member **54*b*3, it is a plot Lg1 that has "○" for the fixability, and has the smallest maximum current amount. In the plot Lg1, the power density is 1.72 [W/mm], and the maximum current amount is 3.23 [A]. The electrical resistance of the heat generation member 54*b*3 at this time is 31[Ω]. In the shorter heat generation member 54*b*4, it is a plot St1 that has "○" for the fixability, and has the smallest maximum current amount. In the plot St1, the power density is 1.80 [W/mm], and the maximum current amount is 2.78 [A]. The electrical resistance of the heat generation member 54*b*4 at this time is 36[Ω]. That is, in the shorter heat generation member 54*b*4 of the plot St1, the power density becomes higher, and the resistance value also becomes higher compared with the longer heat generation member 54*b*3 of the plot Lg1. In this manner, assuming that the longer heat generation member 54*b*3 is 31[Ω], and the shorter heat generation member 54*b*4 is 36[Ω], the fixability can be satisfied, and the maximum current amount can be kept to 3.23 [A] or less. Then, low cost and low rating wires, elements, etc. can be chosen for bundled wires, electric elements, etc. to be connected to the heat generation member 54*b***.

Note that, in the shorter heat generation member **54*b*4, although the conditions of the plot St1 were recommended, also in a plot St2 indicated by a black dot, the power density is as low as 2.09 [W/mm], and the maximum current amount is 3.23 [A] or less. The electric resistance value of the shorter heat generation member 54*b*4 at this time is 31[Ω]. Even if the electrical resistances are set to the same value, i.e., 31[Ω] for the longer heat generation member 54*b*3, and 31[Ω] for the shorter heat generation member 54*b*4, the fixability can be satisfied, and the maximum current amount can be kept to 3.23 [A] or less. That is, in the shorter heat generation member 54*b*4 of the plot St2, the power density becomes higher, and the resistance value is equal compared with the longer heat generation member 54*b*3 of the plot Lg1. From the above, in the graph of FIG. 12, the shorter heat generation member 54*b*4 can be used in the range from the plot St1 to the plot St2**.

From the above confirmation results, among the non-longest heat generation members **54*b*3 and 54*b*4, the power density of the shorter heat generation member 54*b*4 is made higher than the power density of the longer heat generation member 54*b*3. Accordingly, irrespective of which one of the heat generation members 54*b* is used, the fixability near the non-heating area in the both sides of the heat generation member 54*b* can be satisfied. Further, by making the resistance value of the shorter heat generation member 54*b*4 equal to or higher than the resistance value of the longer heat generation member 54*b*3, the fixing apparatus 50** can be operated with a certain current amount or less, and inexpensive bundled wires, etc. can be used.

As described above, according to Embodiment 2, the deformation of the substrate on which the heater is mounted can be suppressed.

Embodiment 3

Figure 13A:
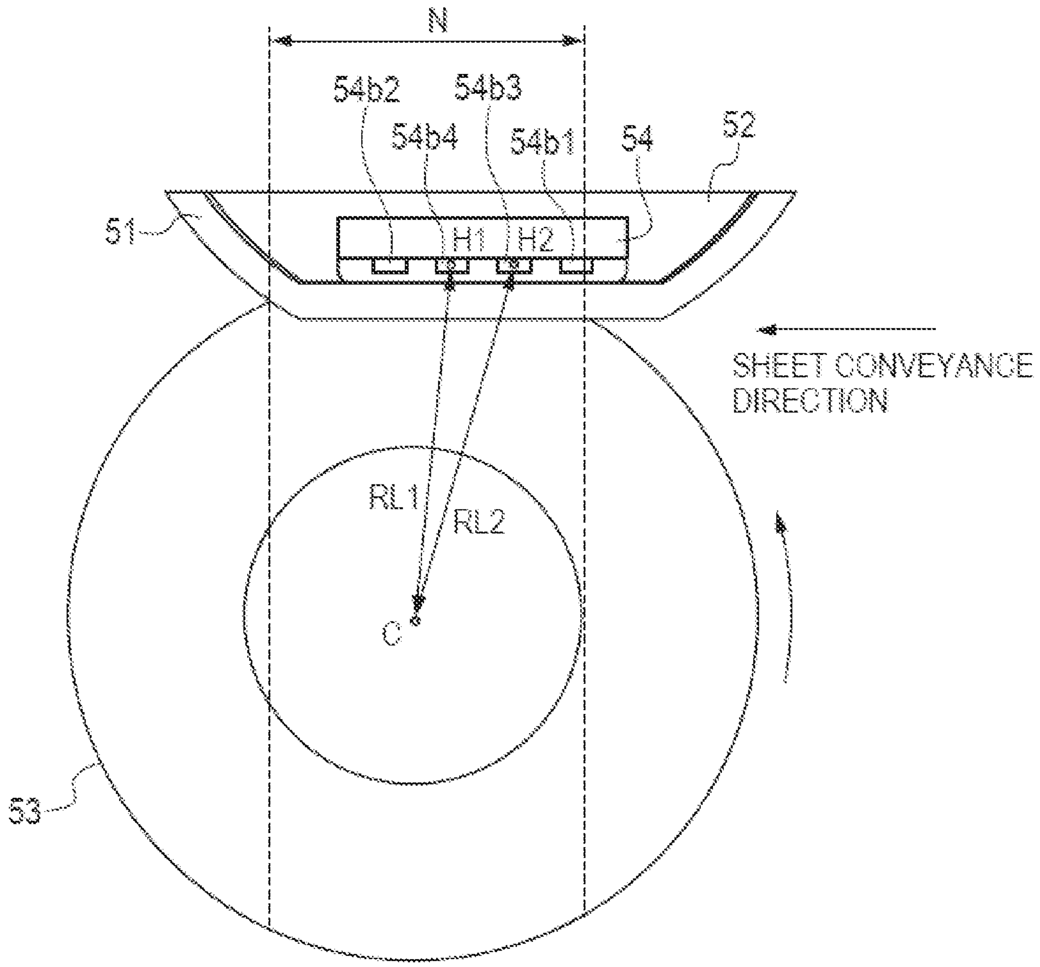
FIG. 13A illustrates a cross-sectional view of a fixing apparatus of Embodiment 3.

FIG. 13A is a cross-sectional view of a fixation nip portion N of the fixing apparatus 50, and illustrates a part of the film 51, a part of the nip forming member 52, the heater 54 and the pressure roller 53. It is assumed that the center of the rotation axis of the pressure roller 53 is C, among the non-longest heat generation members **54*b*3 and 54*b*4, the position of the shorter heat generation member 54*b*4 is H1, and the position of the longer heat generation member 54*b*3 is H2. The distance from the center C to the position H1 is defined as RL1, and the distance from the center C to the position H2 is defined as RL2. Embodiment 3 is characterized in that the heater 54 is arranged at a position where the distance RL1 becomes smaller than the distance RL2 (RL1<RL2). Since the closer the distance between the center C of the pressure roller 53 and the heat generation member 54*b* is, the greater the amount of collapse of the elastic layer of the pressure roller 53** becomes, the pressure in the fixation nip portion N at the position H1 can be made higher than that at the position H2.

Figure 13B:
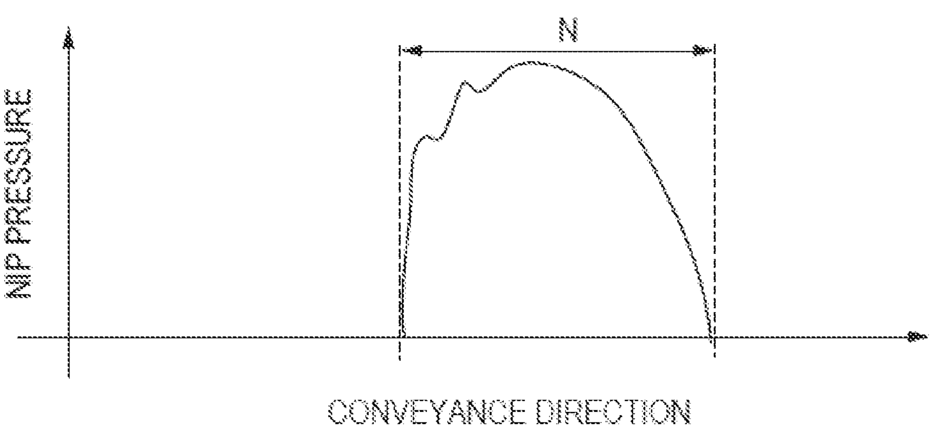
FIG. 13B is a graph illustrating the nip pressure corresponding to the cross-sectional view of the fixing apparatus of Embodiment 3.

FIG. 13B illustrates the profile of the pressure (nip pressure) of the fixation nip portion N in the conveyance direction of the paper P. In FIG. 13B, the horizontal axis represents the position in the conveyance direction corresponding to the fixation nip portion N illustrated in FIG. 13A, and the vertical axis represents the nip pressure. As illustrated in FIG. 13B, in the conveyance direction of the paper P, the nip pressure is the highest at the position of the center C of the pressure roller 53. Additionally, as illustrated in FIG. 13B, it can be seen that the nip pressure at the position H1 is higher than the nip pressure at the position H2.

As described above, the distance from the position of the center of rotation of the pressure roller 53 to the heat generation member **54*b* (the heat generation member 54*b*4 in FIG. 4, etc., and the heat generation member 54*b*5 in FIG. 10) having the shortest length in the longitudinal direction among the third heat generation member and the fourth heat generation member 54*b* is RL1. The distance from the position of the center of rotation of the pressure roller 53 to the other heat generation members, except for the shortest heat generation member among the third heat generation member and the fourth heat generation member, is RL2. Then, in Embodiment 3, the heat generation members 54*b*** are arranged on the substrate at predetermined positions (for example, a center portion) in the longitudinal direction, so that the distance RL1 becomes shorter than the distance RL2.

Since the nip pressure is high, the thermal resistance due to contact can be reduced between the heater 54 and the film 51, and between the film 51 and the pressure roller 53, and the heat transfer property between each component can be improved. With this improvement in the heat transfer property, even if power is excessively supplied to the heat generation member **54*b* at the time of occurrence of an unexpected failure, the excessive heat generated by the heater 54 can be quickly conducted to the pressure roller 53 having a high thermal capacity, etc. That is, the deformation risk of the substrate 54*a*** can be reduced.

Since the shorter the length of the heat generation member **54*b* in the longitudinal direction is, the larger the non-heating area becomes, and the more heat is taken away, the power density of the shorter heat generation member 54*b*4 can be made higher than the power density of the longer heat generation member 54*b*3. On the other hand, the risk of deformation of the substrate 54*a* at the time of failure is slightly high. In order to reduce this risk, the shorter heat generation member 54*b*4 can be arranged at the position H1 having a higher nip pressure. In Embodiment 3, even if power is excessively supplied to the shorter heat generation member 54*b*4, the generated heat can be quickly transferred to the pressure roller 53, etc., and the risk of deformation of the substrate 54*a* can be reduced. As described above, when incorporating the heater 54 described in Embodiment 1 and Embodiment 2 into the fixing apparatus 50, among the non-longest heat generation members 54*b*3 and 54*b*4, the shorter heat generation member 54*b*4 is arranged closer to the center C of the pressure roller 53 than the longer heat generation member 54*b*3. Accordingly, the risk of deformation of the substrate 54*a*** can be reduced.

As described above, according to Embodiment 3, the deformation of the substrate on which the heater is mounted can be suppressed.

According to the present invention, the deformation of the substrate on which the heater is mounted can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-006469, filed Jan. 18, 2019, which is hereby incorporated by reference herein in its entirety.

What is claimed is:

1. A heater comprising:
- a substrate;
- a first heat generation member having a length in a longitudinal direction;
- a second heat generation member having a length in the longitudinal direction, the length being substantially equal to the length of the first heat generation member;
- a third heat generation member having a length in the longitudinal direction, the length being shorter than the lengths of the first heat generation member and the second heat generation member;
- a fourth heat generation member having a length in the longitudinal direction, the length being shorter than the length of the third heat generation member; and
- wherein the first heat generation member, the second heat generation member, the third heat generation member, and the fourth heat generation member are arranged on the substrate,
- wherein the first heat generation member is arranged at one end of the substrate in a width direction,
- wherein the second heat generation member is arranged at another end of the substrate in the width direction, to be symmetrical with the first heat generation member,
- wherein the third heat generation member and the fourth heat generation member are arranged between the first heat generation member and the second heat generation member in the width direction of the substrate,
- wherein the first heat generation member, the third heat generation member, the fourth heat generation member and the second heat generation member are arranged in this order in the width direction,
- wherein a relationship of $R1<R2$ is satisfied, and
- wherein a relationship of $R1\times L1>R2\times L2$ is satisfied,
- where L1 is the length of the third heat generation member in the longitudinal direction, R1 is a value of a resistance of the third heat generation member, L2 is the length of the fourth heat generation member in the longitudinal direction, and R2 is a value of a resistance of the fourth heat generation member.

2. A heater according to claim 1, wherein a value of a combined resistance of the first heat generation member and the second heat generation member is smaller than a value of a resistance of the third heat generation member, and a value of a resistance of the fourth heat generation member, and
- wherein the first heat generation member and the second heat generation member are electrically connected in parallel.

3. A heater according to claim 1, wherein the third heat generation member and the fourth heat generation member are arranged to be symmetrical in the width direction of the substrate.

4. A heater according to claim 1, further comprising:
- a first contact to which one end of the first heat generation member and one end of the second heat generation member are electrically connected;
- a second contact to which another end of the first heat generation member and another end of the second heat generation member and one end of the third heat generation member are electrically connected;
- a third contact to which another end of the third heat generation member and one end of the fourth heat generation member are electrically connected; and
- a fourth contact to which another end of the fourth heat generation member is electrically connected.

5. A heater according to claim 1, further comprising:
- a first contact to which one end of the first heat generation member and one end of the third heat generation member are electrically connected;
- a second contact to which one end of the fourth heat generation member and one end of the second heat generation member are electrically connected;
- a third contact to which another end of the third heat generation member is electrically connected; and
- a fourth contact to which another end of the fourth heat generation member is electrically connected,
- wherein another end of the first heat generation member and another end of the second heat generation member are electrically connected to each other.

6. A heater according to claim 1, further comprising:
- a first contact to which one end of the first heat generation member and one end of the second heat generation member are electrically connected;
- a second contact to which another end of the first heat generation member and another end of the second heat generation member and one end of the third heat generation member are electrically connected;
- a third contact to which another end of the third heat generation member and one end of the fourth heat generation member are electrically connected; and
- a fourth contact to which another end of the fourth heat generation member is electrically connected.

7. A fixing apparatus for fixing an unfixed toner image carried by a recording material, the fixing apparatus comprising:
- a heater;
- a first rotary member heated by the heater; and
- a second rotary member forming a nip portion with the first rotary member,
- wherein the heater comprising:
  - a substrate;
  - a first heat generation member having a length in a longitudinal direction;
  - a second heat generation member having a length in the longitudinal direction, the length being substantially equal in to a length of the first heat generation member;
  - a third heat generation member having a length in the longitudinal direction, the length being shorter than the lengths of the first heat generation member and the second heat generation member;

a fourth heat generation member having a length in the longitudinal direction, the length being shorter than the length of the third heat generation member; and wherein the first heat generation member, the second heat generation member, the third heat generation member, and the fourth heat generation member are arranged on the substrate, wherein the first heat generation member is arranged at one end of the substrate in a width direction, wherein the second heat generation member is arranged at another end of the substrate in the width direction, to be symmetrical with the first heat generation member, wherein the third heat generation member and the fourth heat generation member are arranged between the first heat generation member and the second heat generation member in the width direction of the substrate, wherein the first heat generation member, the third heat generation member, the fourth heat generation member and the second heat generation member are arranged in this order in the width direction, wherein a relationship of R1<R2 is satisfied, and wherein a relationship of R1×L1>R2×L2 is satisfied, where L1 is the length of the third heat generation member in the longitudinal direction, R1 is a value of a resistance of the third heat generation member, L2 is the length of the fourth heat generation member in the longitudinal direction, and R2 is a value of a resistance of the fourth heat generation member.

8. A fixing apparatus according to claim 7, wherein the first rotary member is a film.

9. A fixing apparatus according to claim 8, wherein the heater is provided in an inner space of the film, wherein the heater and the second rotary member pinch the film, and wherein an image on a recording material is heated at the nip portion formed between the film and the second rotary member, through the film.

10. A fixing apparatus according to claim 7, wherein at a predetermined position in the longitudinal direction, a distance from a position of a center of rotation of the second rotary member to a heat generation member having a shortest length in the longitudinal direction among other heat generation members except for the first heat generation member and the second heat generation member is shorter than a distance from the position of the center of rotation of the second rotary member to a heat generation member except for the heat generation member having the shortest length among the other heat generation members.

11. An image forming apparatus comprising:

an image forming unit configured to form an unfixed toner image on a recording material; and a fixing apparatus according to claim 7, wherein the fixing apparatus is configured to fix the unfixed toner image on the recording material.

12. An image forming apparatus according to claim 11, wherein a value of a combined resistance of the first heat generation member and the second heat generation member is smaller than a value of a resistance of the third heat generation member, and a value of a resistance of the fourth heat generation member.

13. An image forming apparatus according to claim 11, wherein the third heat generation member and the fourth heat generation member are arranged to be symmetrical in the width direction of the substrate.

14. An image forming apparatus according to claim 11, further comprising:

a first contact to which one end of the first heat generation member and one end of the second heat generation member are electrically connected;

a second contact to which another end of the first heat generation member and another end of the second heat generation member and one end of the third heat generation member are electrically connected;

a third contact to which another end of the third heat generation member and one end of the fourth heat generation member are electrically connected; and a fourth contact to which another end of the fourth heat generation member is electrically connected.

15. An image forming apparatus according to claim 11, further comprising:

a first contact to which one end of the first heat generation member and one end of the third heat generation member are electrically connected;

a second contact to which one end of the fourth heat generation member and one end of the second heat generation member are electrically connected;

a third contact to which another end of the third heat generation member is electrically connected; and a fourth contact to which another end of the fourth heat generation member is electrically connected, wherein another end of the first heat generation member and another end of the second heat generation member are electrically connected to each other.

16. A fixing apparatus according to claim 7, wherein a value of a combined resistance of the first heat generation member and the second heat generation member is smaller than a value of a resistance of the third heat generation member, and a value of a resistance of the fourth heat generation member.

17. A fixing apparatus according to claim 7, wherein the third heat generation member and the fourth heat generation member are arranged to be symmetrical in the width direction of the substrate.

18. A fixing apparatus according to claim 7, further comprising:

a first contact to which one end of the first heat generation member and one end of the third heat generation member are electrically connected;

a second contact to which one end of the fourth heat generation member and one end of the second heat generation member are electrically connected;

a third contact to which another end of the third heat generation member is electrically connected; and a fourth contact to which another end of the fourth heat generation member is electrically connected, wherein another end of the first heat generation member and another end of the second heat generation member are electrically connected to each other.

* * * * *